United States Patent [19]

D'Alelio

[11] 3,998,786

[45] Dec. 21, 1976

[54] PROCESS FOR PREPARING AROMATIC POLYIMIDES, POLYIMIDES PREPARED THEREBY

[75] Inventor: Gaetano Francis D'Alelio, South Bend, Ind.

[73] Assignee: University of Notre Dame du Lac, Notre Dame, Ind.

[22] Filed: May 25, 1973

[21] Appl. No.: 363,800

[52] U.S. Cl. .................. 260/47 CP; 260/33.4 P; 260/46.5 E; 260/47 UA; 260/49; 260/63 R; 260/65; 260/67 R; 260/78 TF; 260/78 UA; 428/474

[51] Int. Cl.$^2$ ................. C08G 73/10; C08G 73/12

[58] Field of Search ...... 260/47 CP, 47 UA, 28 TF, 260/78 UA, 33.4 P, 65, 63 N, 63 R, 46.5 E, 49, 67 R, 30.4 N

[56] References Cited

UNITED STATES PATENTS

| | | | |
|---|---|---|---|
| 3,179,634 | 4/1965 | Edwards | 260/78 |
| 3,277,043 | 10/1966 | Holub | 260/33.4 |
| 3,576,691 | 4/1971 | Meyers | 156/309 |
| 3,671,490 | 6/1972 | Bargain | 260/47 |
| 3,678,015 | 7/1972 | Holub et al. | 260/78 |
| 3,709,862 | 1/1973 | Minami | 260/47 |

*Primary Examiner*—Lester L. Lee

[57] ABSTRACT

A process for preparing substantially completely cyclized aromatic polyimides, either monomeric, oligomeric or polymeric, is provided. The process involved the reaction of a mixture of at least one tetracarboxylic acid dianhydride and at least one aromatic diamine in at least one aromatic phenol, preferably cresols, in the presence of an organic azeotroping agent such as a cyclic hydrocarbon, preferably benzene, until substantially all of the water of reaction is eliminated. Other monomers, e.g., a monoamine or an $\alpha,\beta$-carboxylic acid monoanhydride can be added to the mixture so as to provide reactive end groups, preferably olefinically terminated, which will enable the polyimide to cure by coupling together by addition or condensation thereby increasing molecular weight with little or no by-product. After the water is removed, it is preferred that the azeotroping agent be removed and then the polyimide increased in molecular weight by heating in the aromatic phenol.

The polymer can then be isolated by concentration or precipitation as a powder, or the polymer in solution can be used to prepare coatings on various substrates.

22 Claims, No Drawings

PROCESS FOR PREPARING AROMATIC POLYIMIDES, POLYIMIDES PREPARED THEREBY

BACKGROUND OF THE INVENTION

1. Field of Invention

This invention relates to processes for preparing polyimides and to certain novel polyimides and more particularly to processes for preparing polyimides which are soluble in phenolic solvents.

2. Prior Art

The prior art is replete with references teaching the preparation of polyimides and polyimide precursors by the reaction of aromatic tetracarboxylic acids, or anhydrides thereof, with aromatic diamines. While the polyimide articles formed have excellent heat resistance, it is difficult to form articles because of their insolubility and intractability. This has necessitated the use of polyimide precursors which can be shaped into the desired form and then cured to the polyimides. However, a difficulty with the precursors is their release of by-products during curing which can result in powdering and formation of voids in the article or the use of polyimides having lower thermal stability. To minimize or avoid these problems, thin layers must be used, especially in wire enameling, and the desired thickness built up by applying numerous layers. Thus, there is a continuing need in the art for thermally stable polyimides that can cure in thick sections without the aforementioned difficulties.

References illustrative of the state of the art are U.S. Pat. No. 3,277,043, issued Oct. 4, 1966 to Fred F. Holub, U.S. Pat. No. 3,678,015, issued to Fred F. Holub et al. and U.S. Pat. No. 3,666,709, issued May 30, 1972 to Munchiko Suzuki et al. The former teaches a process for preparing phenolic solvent soluble polymers by the reaction of an anhydride and diamine in a phenol under initially substantially anhydrous conditions. The latter teaches a phenolic solvent soluble polyimide by reacting an aromatic tetracarboxylic acid and a diamine in a phenolic solvent at a temperature above the boiling point of water. The second patent shows a process for preparing a polyimide precursor by reacting a diamine and an aliphatically unsaturated hydrocarbon monoanhydride (with up to 10% dianhydride) in the presence of an inert hydrocarbon solvent and an inert phenolic solvent.

SUMMARY OF THE INVENTION

According to the present invention there is provided a process for the preparation of a substantially cyclized polyimide of the formula:

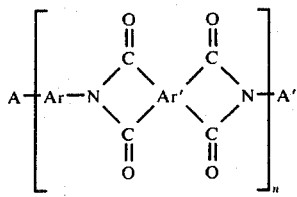

(A)

wherein

Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical,

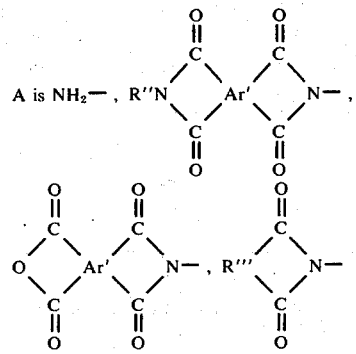

or HOOC—R'''—CONH— where R'' and R''' are defined hereinafter,

A' is —R'', —ArNH$_2$, —ArN(CO)$_2$Ar'(CO)$_2$O,

—ArN(CO)$_2$R''', —ArNHOCR'''COOH or

—ArN(CO)$_2$Ar'(CO)$_2$NR'' where R'' and R''' are defined hereinafter, and $n$ is 0 or a positive integer of at least one, soluble in an aromatic phenol which comprises:

1. reacting a reaction mixture of at least one tetracarboxylic acid dianhydride of the formula:

(B)

O(CO)$_2$Ar'(CO)$_2$O wherein Ar' is as defined above, and at least one aromatic diamine of the formula:

H$_2$N—Ar—NH$_2$     (C)

wherein Ar is as defined above, at a molar ratio of dianhydride to diamine in the range of $m$ to $m + 1 : m$ to $m+1$ where $m$ is a positive integer of at least one and as high as $n$ in formula (A), with the proviso that when the ratio of dianhydride to diamine is $m + 1 : m$, the reaction mixture contains 0 or 2 moles of a monoamine of the formula R″NH₂ wherein R″ is a hydrocarbon radical of 1 to 12 carbon atoms which is saturated, has olefinic unsaturation or acetylenic unsaturation, and —CN, —CHO or —CH=NR″ substituted derivatives thereof, and when the ratio of dianhydride to diamine is $m:m + 1$, the reaction mixture contains 0 or 2 moles of an α,β-carboxylic acid monoanhydride of the formula

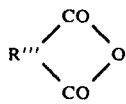

where R‴ is a hydrocarbon radical of 2 to 12 carbon atoms which is saturated, has olefinic unsaturation or benzenoid unsaturation, in an aromatic phenol of the formula

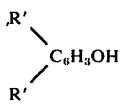

where each R′ is hydrogen or —CH₃ is the presence of at least one organic azeotroping agent which:

a. gives a water azeotrope having a boiling point less than 95° C. at atmospheric pressure, b. is non-reactive with the dianhydride and the diamine, and c. separates from water as a distinct phase, said reaction conducted at a temperature less than 140° C. and below the boiling point of said aromatic phenol and higher than the boiling point of said azeotroping agent with the vapor phase temperature being between that of the water azeotrope and no higher than 95° C.

2. removing water of reaction and the azeotroping agent from the reaction mixture as a water azeotrope and 3. returning quantities of azeotroping agent to the reaction mixture to maintain the temperature and reaction mixture volume substantially constant.

There is also provided a self-crosslinking polyimide having the structural formula:

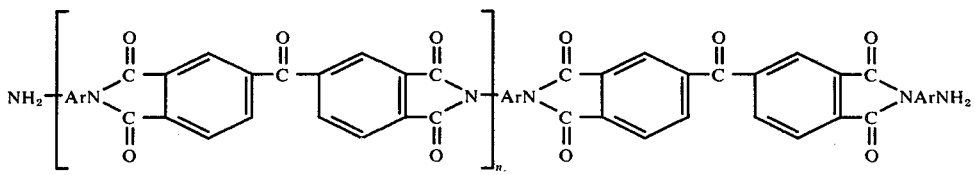

wherein

Ar is a divalent aromatic organic radical, and n is a positive integer of at least 4.

There is further provided an end-capped polyimide having the structural formula:

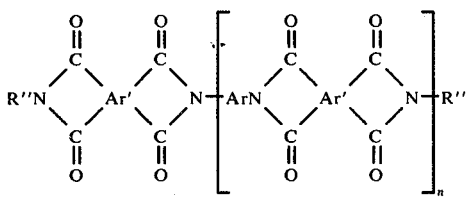

wherein

Ar, Ar′ and R″ are as define previously and n is at least 4.

DETAILED DESCRIPTION OF THE INVENTION

The process of the present invention uses as starting materials an aromatic dianhydride, an aromatic diamine, an aromatic phenol solvent and an organic azeotroping agent. Optional materials are a monoamine and an α,β-carboxylic acid monoanhydride. The aromatic dianhydride has the general formula:

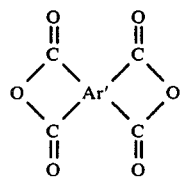

wherein Ar′ is a tetravalent aromatic organic radical, preferably containing at least one ring of six carbon atoms, said ring characterized by benzenoid unsaturation, the four carbonyl groups being attached directly to separate carbon atoms and each pair of carbonyl groups being attached to adjacent carbon atoms in the Ar′ radical. Any of the aromatic tetracarboxylic acid dianhydrides known in the prior art can be used. Among the useful dianhydrides are 3,3′, 4,4′-benzophenonetetracarboxylic acid dianhydride, pyromellitic dianhydride, 2,3,6,7-naphthalene tetracarboxylic acid dianhydride, 3,3′, 4,4′-diphenyl tetracarboxylic acid dianhydride, 1,2,5,6-naphthalene tetracarboxylic acid dianhydride, 2,2′, 3,3′-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis-(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride and thiophene-2,3,4,5-tetracarboxylic acid dianhydride and the like. Preferred dianhydrides are 3,3′, 4,4′-benzophenonetetracarboxylic dianhydride, pyromellitic anhydride and 1,4,5,8- naphthalene-tetracarboxylic and dianhydride with the first one most preferred.

Aromatic diamines useful in the present process have the general formula:

wherein Ar is a divalent aromatic organic radical. Preferred aromatic diamines are those wherein Ar is a divalent benzenoid radical selected from the group consisting of

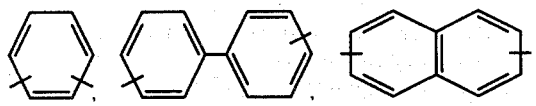

and multiples thereof connected to each other by $R^{IV}$, e.g.,

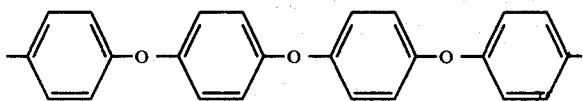

wherein $R^{IV}$ represents —CH=CH—, an alkylene chain of 1–3 carbon atoms,

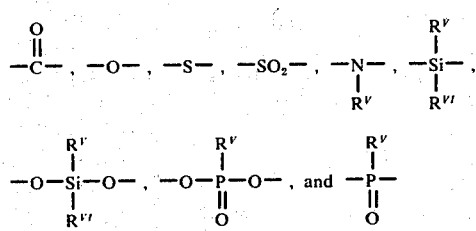

wherein $R^V$ and $R^{VI}$ are each selected from the group consisting of alkyl and aryl containing one to six carbon atoms, e.g., methyl, ethyl, propyl, hexyl, n-butyl, and i-butyl.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 4,4'-diaminostilbene, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4', 4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxy-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethyl-4,4'-diaminodiphenylsulfone, 3,3'-dimethoxy-4,4'-diaminodiphenylsulfone, 3,3'-diethoxy-4,4'-diaminodiphenylsulfone, 3,3'-dichloro-4,4'-diaminodiphenylsulfone, 3,3'-dibromo-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are m-phenylenediamine, p-phenylenediamine, 4,4'-oxydianiline, 3,3'-sulfonyldianiline, 4,4'-diaminobenzophenone, 4,4'-methylenedianiline and 4,4'-diaminostilbene.

The aromatic phenols useful as solvents have the formula

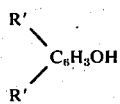

where each R' is hydrogen or a methyl radical. These phenols include phenol, the various cresol isomers such as o-, m-, and p-cresol, and the various xylenols such as 2,3-xylenol, 2,4-xylenol, 2,5-xylenol, 2,6-xylenol, 3,4-xylenol and 3,5-xylenol. Of these, the cresols are preferred. In particular, pure m-cresol or a mixture of m-cresol and the other isomers is especially preferred because of commercial availability and its ease of recovery. The ratio of phenol solvent to dianhydride and diamine can be varied over a wide range depending on the nature of the reactants. Usually, enough solvent is used to dissolve the reactants.

Any organic compound can be used as the azeotroping agent to remove water formed during the reaction provided it (a) gives a water azeotrope having a boiling point less than 95° C. at atmospheric pressure, preferably less than 90° C., (b) is non-reactive with the dianhydride and the diamine and (c) separates from water as a distinct phase when condensed so that the agent can be returned to the reaction mixture to maintain the temperature of reaction and the reaction mixture volume substantially constant (only water is depleted). The organic compound should also be soluble in the phenolic solvent. Examples of such azeotroping agents and their azeotrope boiling points with water are as follows:

| Agent | Azeotrope B.P. ° C. |
| --- | --- |
| Benzene | 69.4 |
| Butyl chloride | 68.0 |
| Butyl ether | 94.1 |
| Butyronitrile | 88.7 |
| Carbon tetrachloride | 66.8 |
| Chloroform | 56.3 |
| Cyclohexane | 69.8 |
| 1-Butenylmethyl ether-cis | 64.0 |
| 1-Butenylmethyl ether-trans | 67.0 |
| Butyl acetate | 90.7 |
| Ethyl acetate | 70.4 |
| Ethyl benzene | 92.0 |
| Ethylbutyl ether | 76.6 |
| Ethylenedichloride | 71.6 |
| Heptane | 79.2 |
| Hexane | 61.6 |
| Isopropyl ether | 62.2 |
| Methyl acetate | 56.1 |
| Octane | 89.6 |
| Propionitrile | 82.2 |
| Propyl acetate | 82.4 |
| Tetrachloroethylene | 88.5 |
| Toluene | 85.0 |
| 1,1,2-Trichloroethane | 86.0 |
| m-Xylene | 94.5 |

Ternary systems can also be used. Illustrative ternary systems and their azeotrope boiling points with water are:

| Agents | Azeotrope B.P. ° C. |
| --- | --- |
| Acetonitrile/Benzene | 66.0 |
| Acetonitrile/Isopropyl ether | 59.0 |
| Acetonitrile/Trichloroethylene | 67.0 |

Preferred azeotroping agents are the cyclic hydrocarbons of 6 to 8 carbon atoms, with the aromatic hydrocarbons particularly preferred. While benzene is preferred because of its low boiling point, toluene is also preferred because of its lower toxicity. Saturated cyclic hydrocarbons such as cyclohexane, cyclooctane and the like can also be used but they are not as preferred as the aromatic hydrocarbons.

The optional materials which can be present in the reaction mixture are a monoamine and an $\alpha,\beta$-carboxylic acid monoanhydride. When the optional materials are not used, the polyimides prepared by the present process either have two anhydride end groups (when the molar ratio of dianhydride to diamine is $m+1{:}m$), two amine end groups (when the molar ratio of dianhydride to diamine is $m{:}m+1$) or one anhydride end group and one amine end group (when the molar ratio of dianhydride to diamine is $m{:}m$). When the optional materials are used, two moles are used to end-cap the polyimide. Thus, when the molar ratio of dianhydride to diamine is $m+1{:}m$, two moles of the monoamine $R''NH_2$ can be added to the reaction mixture and when the molar ratio is $m{:}m+1$, two moles of the $\alpha,\beta$-carboxylic acid monoanhydride can be added to the reaction mixture.

The monoamine used has the formula $R''NH_2$ wherein $R''$ is a hydrocarbon radical of 1 to 12 carbon atoms which is saturated, has olefinic unsaturation or acetylenic unsaturation, e.g., aliphatics such as alkyl, alkylene and alkyne, cycloaliphatics such as cycloalkyl and cycloalkylene, aromatics such as aryl, alkaryl, aralkyl. Also included are the —CN, —CHO and —CH=N-$R''$ derivatives of the hydrocarbon radicals. Examples of $R''$ are —CH$_3$, —C$_2$H$_5$, —C$_3$H$_7$, —C$_8$H$_{17}$, —CH=CH$_2$, —CH$_2$CH=CH$_2$, —CH$_2$CH=CHCH$_3$, —CH=CHCH$_3$, —C≡CH, —C≡CCH$_3$, —CH$_2$C≡CH, —CH=CHCH=CH$_2$, —C$_6$H$_{11}$ (cyclohexane), —C$_6$H$_9$ (cyclohexene), —C$_5$H$_9$ (cyclopentane), —C$_5$H$_7$ (cyclopentene), —C$_6$H$_5$ (phenyl), —C$_6$H$_4$CH$_3$, —C$_6$H$_3$(CH$_3$)$_2$, —C$_6$H$_5$C$_2$H$_5$, —C$_{10}$H$_7$ (naphthyl), —C$_{10}$H$_6$CH$_3$, —C$_{10}$H$_5$(CH$_3$)$_2$, —CH$_2$C$_6$H$_5$, —CH$_2$C$_6$H$_4$CH$_3$, —C$_6$H$_4$CH=CH$_2$,

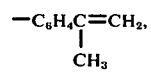

—CH$_2$C$_6$H$_4$CH=CH$_2$, —C$_6$H$_4$CH$_2$CH=CH$_2$, —C$_6$H$_4$C≡CH, —C$_6$H$_4$C≡CCH$_3$ and —C$_6$H$_4$CH$_2$C≡CCH$_3$.

Examples of —CN, —CHO and —CH=NR'' derivatives thereof are —CH$_2$CN, —CH$_2$CH=CHCN, —CH$_2$C≡CCN, —C$_6$H$_4$CN, —C$_6$H$_3$(CH$_3$)CN, —C$_6$H$_4$CH$_2$CN, —CH$_2$C$_6$H$_4$CN, —C$_6$H$_4$CN, —C$_6$H$_4$CH=CHCN, —C$_{10}$H$_7$CN, —C$_6$H$_3$(CN)$_2$, —CH$_2$C$_6$H$_4$CH$_2$CN, —C$_6$H$_4$CHO, —C$_6$H$_4$CH$_2$CHO, —CH$_2$C$_6$H$_4$CH$_2$CHO, —CH$_2$C$_6$H$_4$CHO, —C$_6$H$_4$CH=CHCHO, —C$_6$H$_4$CH=NC$_6$H$_5$, —C$_6$H$_4$CH$_2$CH=NC$_6$H$_4$CH$_3$ and the like. Preferred monoamines are allyl amine, styryl amine, propargyl amine, aminobenzyl cyanide, and aminobenzyl nitrile with allyl amine, styryl amine and propargyl amine particularly preferred.

The $\alpha,\beta$-carboxylic acid monoanhydride used has the formula

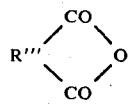

wherein $R'''$ is a hydrocarbon radical of 2 to 12 carbon atoms which is saturated, has olefinic unsaturation or benzenoid unsaturation. Examples of such monoanhydrides are

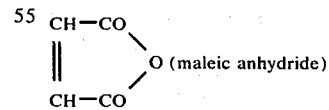 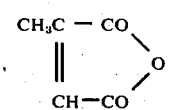

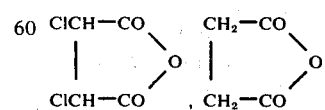 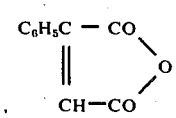

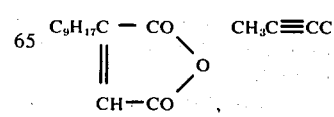 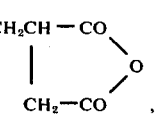 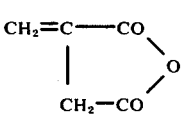

-continued

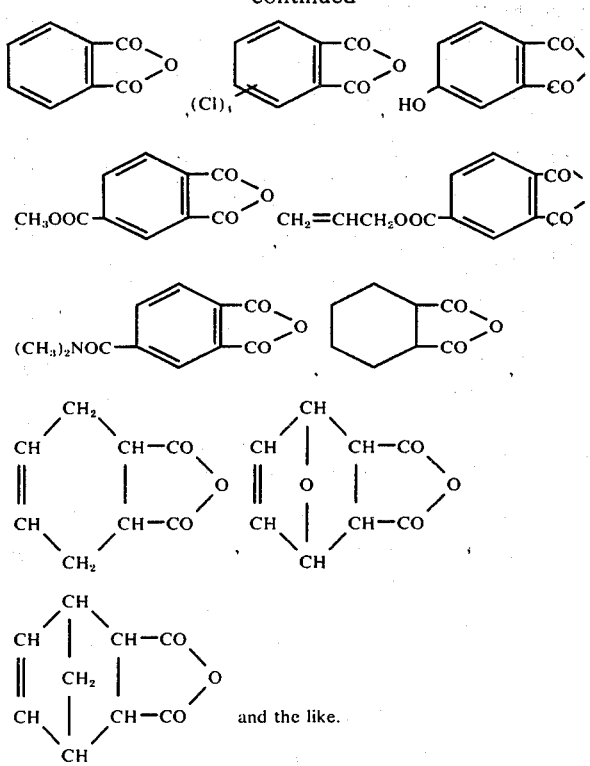

and the like.

The terms α,β in the expression α,β-monocarboxylic monoanhydride has reference to the position of substitution of the two carbonyl groups in the anhydride, and is equivalent to a 1,2 substitution on adjacent carbon atoms; in the benzenoid series this substitution is referred to as ortho substitution. The preferred monoanhydrides are maleic anhydride and phthalic anhydride.

When maleic anhydride is used as the monoanhydride, cyclization is easily accomplished by removing the azeotroping agent from the reaction mixture and then adding a lower aliphatic acid anhydride such as acetic acid and an alkali metal salt of a lower aliphatic acid such as sodium or potassium acetate.

In carrying out the process of the invention, a reaction mixture of at least one dianhydride, at least one diamine and optionally the monoamine or monoanhydride, in at least one aromatic phenol solvent is reacted in the presence of the organic azeotroping agent until substantially all of the water of reaction is eliminated. The reaction temperature is less than 140° C. and also should be below the boiling point of the aromatic phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional deanstark trap and condenser wherein after the azeotrope condenses, the water preferably sinks to the bottom of the trap for subsequent removal and the azeotroping agent overflows the trap and returns to the reaction mixture. Initially, the trap is filled with azeotroping agent.

The present azeotroping process with a return of the azeotroping agent is unique in that it prepares a substantially completely cyclized polyimide at low temperatures which is soluble in phenolic solvent. Time of reaction is generally less than 1 hour (usually 30–45 minutes) with a substantially quantitative yield of the polyimide in solution.

After the water of reaction is eliminated, the azeotroping agent is usually removed so that the solution of polyimide in aromatic phenol can either be directly used as a coating composition or adhesive or further treated before the polyimide is used. Further treatment of the solution can involve precipitation of the polyimide as a powder which can then be used in end-use applications. Also, the solution can be bodied, i.e., the polyimide increased in molecular weight by heating the solution with periodic removal of some of the phenolic solvent. Further, the polyimides can be further reacted to higher molecular weight polymers as described in my copending application Ser. No. 363,801, filed even date herewith.

Many of the polyimides prepared are novel polymeric materials. For example, when 3,3',4,4'-benzophenone-tetracarboxylic acid dianhydride is used as the dianhydride and the molar ratio of dianhydride to diamine is $m:m + 1$, a self-crosslinking polyimide is prepared. It has the structural formula:

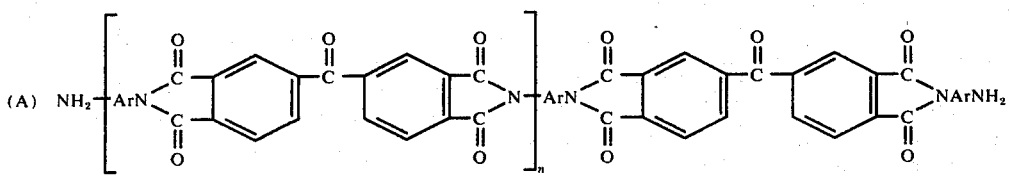

wherein
Ar is a divalent aromatic organic radical, and
n is a positive integer of at least 4.

Also, many of the end-capped polyimides are novel. For example, when the molar ratio of dianhydride to diamine is $m + 1:m$ and 2 moles of the preferred monoamine are used, an end-capped polyimide is prepared having the structural formula:

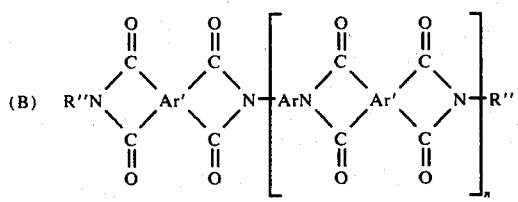

wherein
Ar and Ar' are as defined above,

R" is allyl, styryl, propargyl, —C₆H₄CN or —C₆H₄CH₂CN, and n is a positive integer of at least 4. The polyimides described above in (A) and (B) wherein n is at least 4 have a polyimide character which gives them good thermal stability, especially when cured by cross-linking (A) or post-reacting (B) as described in my aforementioned copending application Ser. No. 363,801.

In general, however, many substantially cyclized polyimides can be prepared by the process of the invention. They can either be monomeric, oligomeric or polymeric with the degree of repeating units being dependent to some extent on the molar ratio of dianhydride to diamine used. The polyimides prepared will have the structural formula:

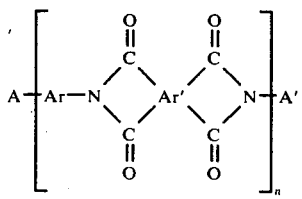

When the ratio is 1:1, the core of the polyimide will generally provide an $n$ of about 10–12 units and when the ratio is about 1.1:1, $n$ will be about 6 or 7 units. However, the number of units n can be as high as 500 to 1,000 or greater. Usually $n$ will be in the range of about 1 to 100, preferably 4 to 15. The process of the invention enables the skilled artisan to control molecular weight through bodying and the reactivity of polymerization.

The soluble polyimides prepared by the present process have a number of uses. These include use of the solutions as wire and insulating varnishes and to impregnate fabric substrates used in making flexible and rigid electronic circuit boards and in making structural laminates. The solutions can be used to make fibers and films and as adhesives, particularly for film substrates, useful in aerospace and electronics applications. The powders can be used as molding powders and to make fibers and films.

The invention can be further understood by the following examples in which parts and percentages are by weight unless otherwise indicated.

EXAMPLE 1

Preparation of Aromatic Nitrile-Terminated Oligomeric Polyimide (BTAN-2). Reaction of 3,3',4,4'-Benzophenone- tetracarboxylic Acid Dianhydride (BTCA), 4,4'-Oxydianiline (ODA) and 4-Aminobenzonitrile (AN) (2:1:1).

An apparatus consisting of a 100-ml. three-neck, round-bottom flask equipped with a magnetic stirrer, Dean-Stark trap and condenser, a dropping funnel, heating mantle, etc. is used in this and numerous following syntheses. For purposes of brevity, it will be called the "m-cresol: benzene azeotropic apparatus."

In the m-cresol:benzene azeotropic apparatus there was placed a solution of 3,3',4,4'-benzophenonetetracarboxylic acid dianhydride (BTCA) (3.222 g., 0.01 mole) in 25 ml. m-cresol and 15 ml. benzene. The mixture was warmed to approximately 50° C. and a solution of 4,4'-oxydianiline (ODA) (1.001 g., 0.005 mole) in 15 ml. of m-cresol was added, giving an immediate yellow precipitate. After 15 minutes, a solution of 4-aminobenzonitrile (AN) (1.299 g., 0.011 mole) in 10 ml. of m-cresol was added. During 2 hours of refluxing, the solution became orange and 0.25 ml of water was collected. Precipitation did not occur. After cooling, the solvents were removed on a rotary flash evaporator and the residue was vacuum-dried at 100° C. to yield 5.177 g. (102%) of phenylnitrile-terminated oligomeric polyimide based on BTCA (BTAN-2). On a Fisher-Johns melting point apparatus, 230° C. was the lowest temperature at which it softened before rehardening immediately. It was soluble in hot m-cresol, slightly soluble in hot dimethyl acetamide (DMAC), and insoluble in hot acetone. A sample of BTAN-2 was post-heated in nitrogen at 300° C. for 24 hours, and its TGA in nitrogen of sample BTAN-2-H300, showed an inflection point at 410° C.

Analysis: Calc'd. for $C_{60}H_{28}N_6O_{11}$:
C, 71.43; H, 2.80; N, 8.03; O, 17.44,
Found: C, 70.83; H, 2.81; N, 7.77; O, - - - .
Found: C, 71.22; H, 2.86; N, 7.93; O, - - -
(dried at 140° C.).

When other dianhydrides of

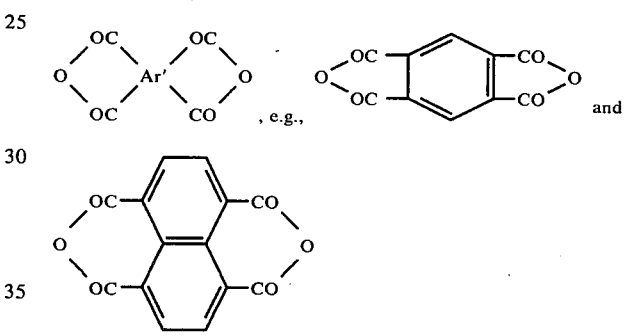

are used in equivalent amounts in this example instead of BTCA, the corresponding completely cyclized, nitrile terminated diimide is obtained. Similarly, when other amines R"NH₂, e.g., NH₂C₆H₄CH=CH₂, NH₂CH=CH₂CH₂, NH₂CH₂C ≡ CH, NH₂C₆H₅CHO, and NH₂C₆H₅CH=NC₆H₅ are used in equivalent amounts in this example instead of AN with BTCA or the other dianhydrides, the corresponding amine terminated diimides are obtained.

EXAMPLE 2

Preparation of Aromatic Nitrile-Terminated Oligomeric Polyimide (BTAN-3). Reaction of BTCA, 3,3'-Sulfonyldianiline (SDA-3,3) and AN (9:8:2).

In a m-cresol: benzene azeotropic apparatus there was placed a solution of BTCA; (2.1750 g., 0.00675 mole) in 25 ml. of m-cresol and 10 ml. of benzene. The solution was warmed to approximately 70° C. and a solution of AN (0.1773 g., 0.0015 mole) in 10 m-cresol was added over about 20 minutes. After stirring at approximately 70° C. for 15 minutes, a solution of 3,3'-sulfonyldianiline (SDA-3,3) (1,4899 g., 0.0060 mole) in 15 ml. of m-cresol was added and the solution was heated to reflux for 3 hours, during which time, 0.3 ml. of water was collected; then the benzene was distilled off and after cooling to room temperature, the solution was added dropwise slowly to 200 ml. of well-stirred methanol, to yield a light-yellow solid. The solid was filtered off, digested four times in hot methanol, and dried at 40° C. for 24 hours, to give 3.40 g. (95%)

of yellow product. The yield, corrected for about 2% retained m-cresol, was 93.5%. The oligomer partially melted at 255° C. and rehardened at 275° C.; it was soluble in m-cresol, DMAC and hot sulfolane, but insoluble in dioxane. A small sample, vacuum-dried at 200° C. for 4 hours, showed a 2% loss of m-cresol, which was confirmed in its TGA in nitrogen, which also shows an inflection point in nitrogen in the 500° C. region. Its DTA in nitrogen shows an endotherm at 225° C.

Analysis: Calc'd. for $C_{263}H_{126}N_{20}O_{61}S_8$:
C, 65.83; H, 2.65; N, 5.84; O, 20.34; S, 5.35.
Found: C, 65.29; H, 2.70; N, 5.36; O, - - -; S, - - -.

The above procedure was repeated except that the quantities used were increased to yield 33.0 g. (97%) of BTAN-3. The quantities used were BTCA, 21.7505 g., 0.0675 mole; SDA-3,3, 14.899 g., 0.060 mole; AN, 1.7172 g., 0.0150 mole.

When other dianhydrides of

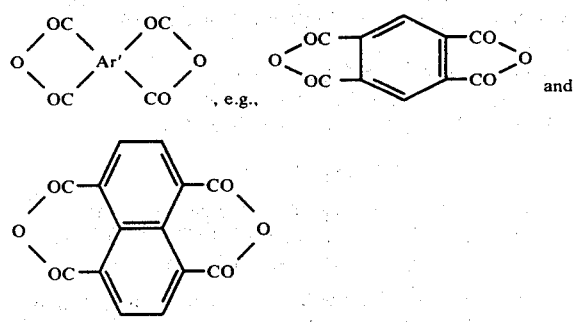

are used in equivalent amounts in this example instead of BTCA, the corresponding completely cyclized, nitrile terminated diimide is obtained. Similarly, when other amines R"NH$_2$, e.g., NH$_2$C$_6$H$_4$CH=CH$_2$, NH$_2$CH$_2$CH=CH$_2$, NH$_2$CH$_2$C≡CH, NH$_2$C$_6$H$_5$CHO, and NH$_2$C$_6$H$_5$CH=NC$_6$H$_5$ are used in equivalent amounts in this example instead of AN with BTCA or the other dianhydrides, the corresponding amine terminated diimides are obtained.

EXAMPLE 3

Preparation of Aromatic Nitrile-Terminated Oligomeric Polyimide (BTAN-4). Reaction of BTCA, 1,3Di(3-Aminophenoxy)benzene (DAPB-3,3) and AN (9:8:2).

In a m-cresol:benzene azeotropic apparatus there was placed a solution of BTCA (2.1753 g., 0.00675 mole) in 25 ml. of m-cresol and 10 ml of benzene. The solution was warmed to approximately 70° C. and a solution of AN (0.1773 g. 0.0015 mole) in 10 ml. of m-cresol was added over about 20 minutes. After stirring for another 15 minutes, a solution of 1,3-di(3-aminophenoxy)benzene (DAPB-3,3) (1.7540 g., 0.0060 mole) in 15 ml of m-cresol was added. The solution was heated to reflux for 3 hours and 0.2 ml of water was collected. Then the benzene was distilled off. After cooling, the clear solution was added dropwise to 200 ml of methanol. The precipitated solid was digested three times in hot methanol and vacuum-dried at 70° C. to give BTAN-4, as a light-yellow solid, 3.4 g. (88%).

The infrared spectrum (KBr disc) of BTAN-4 is given in FIG. 29; it was soluble in m-cresol, DMAC, sulfolane, dioxane; because a paste in methylene chlordie, swelled in chloroform and was insoluble in acetonitrile. BTAN-4 softened at 180° C., melted over the range of 197-218° C., thickened above 290° C., but did not harden within 20 minutes at 300° C., although it did darken somewhat. For the sample dried at 70° C., the DTA in nitrogen showed a melting endotherm at about 180° C.

A sample of BTAN-4, vacuum-dried at 200° C., to eliminate volatiles, was submitted for analysis.
Analysis: Calc'd. for $C_{305}H_{158}N_{20}O_{61}$:
C, 72.13; H, 3.14; N, 5.52; O, 19.22
Found: C, 72.41; H, 3.28; N, 5.11; O, - - -.

EXAMPLE 4

Synthesis of Allyl-Terminated Oligomeric Polyimide (BTAA-3). Reaction of BTCA, ODA and Allylamine (2:1:2).

In a m-cresol:benzene azeotropic apparatus, there was placed a solution of BTCA (3.222 g., 0.01 mole) in 25 ml. of m-cresol and 15 ml. of benzene. The solution was warmed to approximately 60° C. and a solution of ODA (1.001 g., 0.005 mole) in 15 ml. of m-cresol was added, forming an immediate yellow precipitate which dissolved on heating further for 5 minutes. Then, a solution of allylamine (0.629 g., 0.011 mole) in 10 ml of m-cresol was added, after which the solution was heated to reflux; during 2 hours of reflux 0.25 ml. of water was collected. After cooling, the solution was made up to 80 ml. with added benzene, and it was divided into two 40-ml. portions.

The first 40-ml. fraction was added to 250 ml. of methanol and then stirred for 1 hour. This solid material was isolated by centrifuging and dried in a vacuum oven at 80° C. for 36 hours, yielding a yellow solid (A), 1.87 g. (84%).

The second 40-ml. fraction was evaporated on a rotary flash evaporator and the residue was dried in a vacuum oven at 80° C., yielding a yellow solid (B), 2.306 g. (104%). Sample B softened at 130° C., was nearly completely molten at 200–300° C., darkened in 10 minutes at 230° C., was soluble in hot m-cresol, slightly soluble in hot DMAC, and insoluble in acetone.
Analysis: Calc'd. for $C_{52}H_{30}N_4O_{11}$:
C, 70.42; H, 3.41; N, 6.32; O, 19.85.
Found: C, 70.99; H, 3.79; N, 6.47; O, - - -.

A sample of BTAA-3B was postheated in nitrogen at 300° C. for 24 hours, and its TGA in nitrogen, at 10° C./minute, showed an inflection point at 360° C.

EXAMPLE 5

Preparation of Aliphatic Nitrile-Terminated Oligomeric Polyimide (BTBN-1). Reaction of BTCA, ODA and 4-Aminobenzyl Cyanide (BN) (2:1:2).

In a m-cresol:benzene azeotropic apparatus was placed a solution of BTCA (3.222 g., 0.01 mole) in 25 ml. m-cresol and 15 ml of benzene. The mixture was warmed to approximately 50° C. and a solution of ODA (1.001 g., 0.005 mole) in 15 ml. of m-cresol was added, giving an immediate yellow precipitate. After refluxing for 15 minutes, a solution of aminobenzyl cyanide (BN) (1.454 g., 0.011 mole) in 10 ml. of m-cresol was added. The precipitate dissolved quickly. During 1½ hours of reflux, 0.30 ml. of water was collected and a precipitate formed. Then sodium acetate (0.041 g., 0.0005 mole) was added and reflux was continued for another hour, and another 0.05 ml. of water was collected. After cooling, the solvents were removed on a rotary flash evaporator and the residue was dried in a vacuum oven at 100° C., the yield was 5.170 g. (~100%). Its infrared spectrum was consistent with the expected structure. Benzylcyanide-terminated oligomeric polyimide based on BTCA (BTBN-1) softened at 200° C., was almost completely melted by 290° C. and rehardened rapidly at 300° C. Also, it was soluble in hot m-cresol, slightly soluble in hot DMAC, and insoluble in acetone. A sample dried at 300° C. was also submitted for analysis.

Analysis: Calc'd. for $C_{62}H_{32}N_6O_{11}$ :
C, 71.81; H, 3.11; N, 8.11; O, 16.97.
Found (B): C, 70.28; H, 3.22; N, 8.12; O, - - - .
dried at 300° C.)

The TGA in nitrogen on the sample dried at 300° C. showed an inflection point of 360° C.

EXAMPLE 6

Preparation of Aliphatic Nitrile-Terminated Oligomeric Polyimide (BTBN-2). Reaction of BTCA, ODA and BN (2:1:2) using Inverse Order of Addition.

In the m-cresol:benzene azeotropic apparatus was placed a solution of BTCA (3.222 g. 0.01 mole) in 25 ml. of m-cresol and 10 ml. of benzene. After warming to 50° C., a solution of BN (1.3222 g., 0.01 mole) in 10 ml. of m-cresol was added. After 5 minutes, a solution of ODA (1.001 g., 0.005 mole) in 15 ml. of m-cresol was added and the reaction mixture heated to reflux. During 2 hours of relux, 0.30 ml. of water was collected, a precipitate formed in the reaction mixture. The solvents were removed on a rotary flash evaporator and the residue was dried in a vacuum oven at 150° C. to yield a yellow solid, 5.123 g. (99%). The product softened at 60° C., was partially melted by 260° C., but rehardened at 265° C. The infrared spectrum (KBr disc) of BTBN-2 was substantially identical with that of BTBN-1 prepared above. It was soluble in m-cresol and sulfolane but insoluble in DMAC.

Analysis: Calc'd. for $C_{62}H_{32}N_6O_{11}$ :
C, 71.81; H, 3.11.
Found: C, 70.99; H, 2.86.

EXAMPLE 7

Preparation of Aliphatic Nitrile-Terminated Oligomeric Polyimide (BTBN-3). Reaction of BTCA, SDA-3,3 and BN (9:8:2).

According to the azeotropic procedure used in Example 2, BTCA (2.1752 g., 0.00675 mole), BN (0.1982 g., 0.0015 mole) and SDA-3,3 (1.4898 g., 0.0060 mole) were allowed to react. There was obtained 3.27 g. (91%) of a light-yellow solid (BTBN-3). The yield, corrected for approximately 1% retained m-cresol, was 89%.

The oligomer melted at 250–26° C., and rehardened at 290° C. It was soluble in m-cresol, DMAC and hot sulfonlane but insoluble in dioxane.

A small portion, vacuum-dried at 200° C. for 4 hours showed a 1% loss of retained m-cresol, which was confirmed in its TGA in nitrogen which also showed an inflection point in the 500° C. region.

The above procedure was repeated except that the quantities used were such as to yield a larger amount of product: BTCA, 21.750 g., 0.0675 mole; SDA-3,3, 14.899 g., 0.060 mole; BN, 1.982 g., 0.0150 mole. The BTBN-3 obtained from this reaction amounted to 34.8 g. (96%).

Analysis: Calc'd. for $C_{265}H_{130}N_{20}O_{61}S_8$ :

C, 65.94; H, 2.72; N, 5.80; O, 20.22; S, 5.32.
Found: C, 65.18; H, 2.65; N, 5.71; O, - - - ; S, - - - .

EXAMPLE 8

Preparation of Aliphatic Nitrile-Terminated Oligomeric Polyimide (BTBN-4). Reaction of BTCA, DAPB-3,3 and BN (9:8:2).

According to the procedure used in Example 3 to prepare BTAN-4, BTCA (2.1753 g., 0.00675 mole), BN (0.1982 g., 0.0015 mole) and DAPB-3,3 (1.7540 g., 0.0060 mole) were allowed to react to afford, after vacuum-drying at 70° C., BTBN-4, 3.8 g. (97%) as a light-yellow solid. BTBN-4 was soluble in m-cresol, DMAC, sulfolane and dioxane. It was partially soluble in hot chloroform and hot methylene chloride, and was insoluble in acetonitrile.

On a Fisher-Johns melting point apparatus, BTBN-4 softened at 135° C., melted at 196–215° C., thickened above 235° C. and remelted at 255° C. It did not reharden when held for ½ hour at 300° C. A sample of BTBN-4, vacuum-dried at 200° C., was submitted for analysis.

Analysis: Calc'd. for $C_{307}H_{162}N_{20}O_{61}$ :
C, 72.20; H, 3.20; N, 5.49; O, 19.11.
Found: C, 72.21; H, 3.15; N, 5.44; O, - - - .

EXAMPLE 9

Synthesis of Propargyl-Terminated Oligomeric Polyimide (BTPA-1). Reaction of BTCA, ODA and Propargyl Amine (2:1:2).

In the m-cresol:benzene azeotropic apparatus was placed a solution of BTCA (29.001 g., 0.09 mole) in 200 ml. of m-cresol and 50 ml. of benzene. The mixture was warmed to approximately 50° C. and a solution of ODA (9.011 g., 0.045 mole) in 150 ml. of m-cresol was added, forming a slight amount of yellow precipitate. After 10 minutes, a solution of propargyl amine (5 g., 0.0908 mole) in 50 ml. of m-cresol was added and the solution heated to reflux. During 2 hours of reflux, 3.3 ml. of water was collected. After cooling, the deep red solution was concentrated on a rotary flash evaporator. A small sample was removed for analysis and approximately 5 mg. of t-butyl catechol was added to the bulk of the residue, which was vacuum-dried at 100° C. for 30 hours, and then at 150° C. for 12 hours, to give sample A, 37.850 g. (95%) as a dark-brown solid. It softened at 270° C.; partially melted between 280–300° C., but quickly rehardened at 300° C.

Analysis: Calc'd. for $C_{52}H_{26}N_4O_{11}$ :
C, 70.75; H, 2.97; N, 6.35; O, 19.94.
Found: C, 70.84; H, 3.13; N, 6.31; O, - - - .

EXAMPLE 10

Preparation of Styrene-Terminated Oligomeric Polyimide (BTAS-1). Reaction of BTCA, ODA and m-Aminostyrene (AS) (2:1:2).

In the m-cresol:benzene azeotropic apparatus was placed a solution of BTCA (3.222 g., 0.01 mole) in 25 ml. of m-cresol and 10 ml. of benzene. After warming to approximately 70° C., a solution of ODA (1.001 g., 0.005 mole) in 15 ml. of m-cresol containing 2 mg. of t-butyl catechol was added, forming an immediate yellow precipitate. After heating for 15 minutes, a solution of m-aminostyrene (AS) (1.192 g., 0.01 mole, Sapon Laboratories) in 10 ml. of m-cresol was added and the solution was heated to reflux, forming a homogeneous solution. After 1 hour of reflux, a precipitate began to form. After 2 hours of reflux, during which 0.25 ml. of water was collected, the reaction mixture was cooled and poured into 250 ml. of methanol. After stirring for several hours, the solid material was filtered off, washed with methanol and vacuum-dried at 40° C. for 18 hours. The sample still had a distinct odor of m-cresol. A small portion was removed and vacuum-dried at 200° C. for 24 hours to give fraction A whose infrared spectrum was recorded. The remainder of the material was finely divided and stirred with 50 ml. of ether, and dried at 40° C. to afford 4.0402 g. (80%) of a yellow powder, fraction B. The infrared spectrum of sample A was substantially the same as that of sample B.

Sample A softened at 220° C.; was partially molten at 250° C. when pressure was applied; was almost completely molten at 300° C. when pressure was applied; and rehardened (cured) to a granular solid after 25 minutes at 300° C. Sample A was slightly soluble in hot m-cresol.

Sample B softened at 70° C.; was nearly completely molten at 225° C. with applied pressure; and hardened (cured) to a granular solid at 250° C. Sample B was soluble in hot m-cresol, and virtually insoluble in sulfolane, DMAC and toluene.

Analysis: Calc'd. for $C_{62}H_{34}N_4O_{11}$:
C, 73.66; H, 3.39; N, 5.54; O. 17.41.
For A Found: C, 73.21; H, 3.67; N, 5.79; O, - - - .

A portion of sample B was postheated in nitrogen at 300° C. for 24 hours, and a TGA performed in nitrogen at 10° C./minute, showed an inflection point of 410° C.

EXAMPLE 11

Preparation of N,N'-Di(m-Vinylphenyl)-3,3',4,4' Benzophenonetetracarboxylic Acid Diimide (BTAS-2). Reaction of BTCA and AS (1:2).

In the m-cresol:benzene azeotropic apparatus previously described, fitted with provisions for a nitrogen inlet and outlet, was placed under nitrogen a warm (70° C.) solution of BTCA (1.2889 g., 0.004 mole) in 25 ml. of m-cresol and 10 ml. of benzene, containing 1–2 mg. of t-butyl catechol. Then a solution of AS (1.1916 g., 0.01 mole) in 5 ml. of m-cresol was added and the solution heated to reflux. Reflux with stirring was maintained for 2½ hours, during which time approximately 2 ml. of water was collected. After cooling overnight, the clear solution was reheated and benzene was distilled off. After cooling, the solution was added dropwise to 150 ml. of methanol; the solid was isolated by filtration and digested for 15 minutes in 30 ml. of methanol, containing 1–2 mg. of t-butyl catechol. The washing with methanol was repeated twice followed with methanol not containing t-butyl catechol. The solid was filtered off, vacuum-dried at 30° C. for 3 days to give as a yellow solid N,N'-di(m-vinylphenyl)-3,3',4,4'-benzophenonetetracarboxylic acid diimmide (BTAS-2), 1.8567 g. (91%).

BTAS-2 was insoluble in absolute alcohol; it swelled in cold styrene, was soluble in hot styrene and remained soluble on cooling; it was soluble in cold tetrahydrofuran, sulfolane, m-cresol, dioxane and DMAC. The sample appeared to soften at 95–100° C., melted at approximately 180° C., and rehardened (cured) at 210° C. A sample placed on a block preheated to 200° C. melted and rehardened within 5 minutes.

Its DTA in nitrogen showed an endotherm at 185° C. (corr.) followed immediately by an exotherm. Another endotherm occured at 218° C. (corr.) immediately followed by a second exotherm.

The TGA of BTAS-2 in nitrogen at 10° C./minute showed an inflection point of approximately 400° C.

Analysis: Calc'd. for $C_{33}H_{20}N_2O_5$:
C, 75.56; H, 3.84; N, 5.34; O, 10.25.
Found: C, 74.74; H, 3.78; N, 5.71; O, - - - .

EXAMPLE 12

Preparation of Styrene-Terminated Oligomeric Polyimide (BTAS-3). Reaction of BTCA, DAPB-3,3 and AS (8:7:2).

In the m-cresol:benzene azeotropic apparatus fitted with provisions for a nitrogen sweep, was placed a warm solution of BTCA (1.2889 g., 0.004 mole) in 25 ml. of m-cresol and 10 ml. of benzene containing 1–2 mg. of t-butyl catechol. Then a solution of AS (1.1192 g., 0.01 mole) in 5 ml. of m-cresol was added and the solution was then stirred and heated at approximately 70° C. for 15 minutes. Then a solution of DAPB-3,3 (1.023 g., 0.0035 mole) in 10 ml. of m-cresol was added and the solution heated to reflux which was maintained for 4 hours, during which time, approximately 1.5 ml. of water was collected. Then the benzene was distilled off. After cooling to ambient temperature, the slightly hazy solution was added dropwise to 150 ml. of methanol. The solid was filtered off and washed three times in 30 ml. of boiling methanol, which contained a trace of t-butyl catechol, for 15 minutes each time, then it was given a final wash with inhibitor-free boiling methanol. The yellow solid was filtered and vacuum-dried at room temperature for two days to give BTAS-3, 1.782 g. (78%) as a yellow solid. Its TGA in nitrogen at 10° C./minute showed the retention of m-cresol solvent.

On a Fisher-Johns melting point block, it melted at 190—195° C., hardened at 205° C., resoftened and remelted at 210—233° C., and rehardened at 268° C. Its DTA at 20° C./minute showed a melting endotherm at 183° C. BTAS-3 was soluble in dioxane, m-cresol, DMAC and sulfolane; it swelled in tetrahydrofuran, styrene, divinylbenzene and toluene, and was insoluble in methyl ethyl ketone.

A portion of BTAS-3 was vacuum dried at 200° C. for 36 hours and analyzed.

Analysis: Calc'd. for $C_{278}H_{146}N_{16}O_{54}$: C, 72.99; H, 3.22; N, 4.90; O, 18.89 Found: C, 73.55; H, 3.31; N, 503; O, - - -.

EXAMPLE 13

Preparation of Styrene-Terminated Oligomeric Polyimide (BTAS-4). Reaction of BTCA, DAPB-3,3, ODA and AS in 9:(4:4):2 Mole Ratio.

In a large-scale m-cresol:benzene azeotropic apparatus was placed, under a slow nitrogen sweep, BTCA (21.7505 g. 0.0675 mole), 175 ml. of m-cresol and 50 ml. of benzene. The mixture was warmed to approximately 70° C. to dissolve the BTCA and then a solution of AS (1.7874 g., 0.015 mole) in 25 ml. of m-cresol, containing 0.1 g. of t-butyl catechol, was added over approximately ½ hour. The solution was then refluxed for 20 minutes. Then a solution of DAPB-3,3 (8.7699 g., 0.030 mole) and ODA (6.0072 g., 0.030 mole) in 75 ml. of m-cresol was added. Reflux was maintained for 3 hours; 2.47 ml. of water was collected. Then 50 ml. of benzene was distilled off.

After cooling to ambient temperature, the clear solution was added dropwise to 600 ml. of well-stirred methanol. After stirring for 2 hours, the solution was filtered. The isolated solid was heated in 200 ml. of boiling methanol containing approximately 0.1 g. of t-butyl catechol for 1 hour and filtered. The methanol wash was repeated three times. A small portion of the solid was removed and treated in boiling inhibitor-free methanol. This small sample was used for testing purposes, such as melting behavior, solubility, etc. The remainder of the material was vacuum-dried at ambient temperature for 40 hours, to give BTAS-4 as a yellow solid, 36.9 g. (103%). A TGA in nitrogen showed a loss of approximately 5% volatiles before an inflection point at approximately 510° C. The sample was washed once more with hot methanol and vacuum-dried at 40° C. for 16 hours to give 35.3 g. (98%). A TGA in nitrogen showed approximately 2% volatiles.

BTAS-4 was soluble in m-cresol and sulfolane, was partially soluble in hot DMAC and hot N,N-dimethyl formamide DMF, swelled slightly in dioxane, styrene, 75% DVB and chloroform, but was insoluble in methanol and benzene. When heated from ambient to higher temperatures on a Fisher-Johns melting point block, BTAS-4 softened at 185°–205° C., was partially molten at approximately 220° C., was a thick melt 235° C., and hardened after 20 minutes at 300° C. Its TGA in nitrogen showed an inflection point at approximately 510° C. and a 58% residue at 1000° C. The DTA displayed an endotherm (softening or melting) in the region of 190° C., which was followed immediately by a strong exotherm (polymerization) in the region of 190°–210° C., followed by a weak endotherm which blends into a second mild exotherm at approximately 260° C. A 0.20 g. sample of BTAS-4 was heated in an air oven at 200° C. for 5 hours to give BTAS-4-H200. The TGA of BTAS-4-H200 in nitrogen and in air showed the samples to be substantially free of m-cresol. The inflection points in nitrogen and in air are almost identical in the 500° C. region; the difference in nitrogen and in air is found in a char residue of 60% to 0% respectively, at temperatures higher than 600° C.

Analysis: Calc'd. for $C_{289}H_{148}N_{18}O_{57}$: C, 72.55; H, 3.12; N, 5.27; 0, 19.06. Found: C, 72.54; H, 3.20; N, 5.32; O, - - -.

EXAMPLE 14

Preparation of Styrene-Terminated Oligomeric Polyimide (BTAS-10R). Reaction of BTCA, 4,4'-Methylenedianiline (MDA-4,4) and AS (9:8:2).

In the m-cresol:benzene azeotropic apparatus equipped with a nitrogen inlet and outlet, there was placed BTCA (21.7505 g., 0.0675 mole) in 80 ml. of m-cresol and 40 ml. of benzene. The temperature of the mixture was raised to approximately 70° C. as nitrogen was passed through the apparatus, and a solution of m-aminostyrene (AS) (1.7874 g., 0.015 mole) in 40 ml. of m-cresol containing 0.1 g. of t-butyl catechol was added over 15 minutes, and the solution was stirred for an additional 15 minutes. Then a solution of 4,4'-methylenedianiline (MDA-4,4) (11.8956 g., 0.060 mole) in 55 ml. of m-cresol was added and the solution was brought to reflux. After refluxing for 3 hours, during which 2.35 ml. of water was collected, a copious yellow precipitate was present. Then, the benzene was distilled off and the reaction solution was added dropwise to methanol. The precipitated oligomer was digested three times in hot methanol containing approximately 0.1 g. of t-butyl catechol and then vacuum-dried at ambient temperature for 63 hours to afford BTAS-10R, 32.565 g. (98.7%), whose infrared spectrum was consistent with that expected for the compound.

A 2.25 g. sample of BTAS-10R was washed once with methanol to remove the inhibitor to afford 2.190 g. of inhibitor-free BTAS-10R, whose DTA in air showed a slight endotherm at 150° C., followed by an exotherm at 175° C.

Analysis: Calc'd. for $C_{273}H_{148}N_{10}O_{45}$: C, 74.52; H, 3..39; N, 5.73; O, 16..36. Found: C, 73.38; H, 3.52; N, 5.84; O, 16.59.

EXAMPLE 15

Preparation of Styrene-Terminated Oligomeric Polyimide BTAS-11). Reaction of BTCA, 1,3-Di(4-Aminophenoxy)-benzene (DAPB-3,4) and AS (9:8:2).

By the procedure used in the preparation of Example 14, there was reacted BTCA (1.8126 g., 0.00563 mole) in 25 ml of m-cresol and 20 ml of benzene, a solution of AS (0.14909) g., 0.00125 mole) in 10 ml. of m-cresol containing 0.1 g. t-butyl catechol, and solution of 1,3-di(4-aminophenoxy)benzene (DAPB-3,4) (1.4617 g., 0.005 mole) in 20 ml. of m-cresol. After refluxing for 5 hours, there was obtained 0.35 ml. of water and solution had not occurred. Then the benzene was distilled off and the reaction mixture was slowly poured into methanol to precipitate the oligomer. The oligomer was digested three times in hot methanol containing 0.1 g. t-butyl catechol and vacuum-dried at 40° C. to give 3.4882 g. (96.8%) of BTAS-11 as a yellow powder. A small portion of BTAS-11 was digested again in hot methanol to remove the inhibitor for use in testing. Its infrared spectrum was consistent with that expected for the compound.

The TGA in air showed the retention of about 3% m-cresol and an inflection point in the 500° C. region.

Analysis: Calc'd. for $C_{313}H_{164}N_{18}O_{61}$: C, 72.96; H, 3.21; N, 4.89; O, 18.94. Found: C, 72.22; H, 3.11; N, 4.69; O, - - -.

EXAMPLE 16

Preparation of Styrene-Terminated Oligomeric Polyimide (NTAS-1). Reaction of 1,4,5,8-Naphthalenetetracarboxylic Acid Dianhydride (NTCA), DAPB-3,3 and AS (9:8:2).

According to the procedure given above for Example 15, there was allowed to react 1,4,5,8-naphthalenetetracarboxylic acid dianhydride (NTCA) (2.8369 g., 0.01125 mole), DAPB-3,3 (2.9233 g. 0.01 mole) and AS (0.2979 g., 0.0025 mole). There was obtained NTAS-1, as a tan powder which partially melted, with darkening at 220°–260° C., rehardened at 265° C, and then did not change up to 300° C. When a sample was placed on Fisher-Johns apparatus at approximately 220° C., it became completely molten by 260° C. and rehardened at about 265° C.

NTAS-1 was soluble in DMAC, m-cresol, sulfolane and concentrated sulfuric acid, and swelled in hot dioxane. Its infrared spectrum was consistent with that expected for the compound.

Analysis: Calc'd. for $C_{286}H_{146}N_{18}O_{52}$: C, 73.61; H, 3.15; N, 5.40; O, 17.83. Found: C, 73.74; H, 3.50; N, 5.83; O, - - -.

EXAMPLE 17

Preparation of Styrene-Terminated Oligomeric Polyimide (PMAS-1). Reaction of Pyromellitic Anhydride (PMA), DAPB-3,3 and AS (9:8:2).

According to the procedure given above for Example 15, there was allowed to react pyromellitic anhydride (PMA) (2.4538 g., 0.01125 mole), DAPB-3,3 (2.9233 g., 0.01 mole) and AS (0.2979 g., 0.0025 mole). Complete solution did not occur during the reaction period. There was obtained PMAS-1, which melted at 150°–210° C., rehardened at 240° C., and resoftened at 275° C., and rehardened after 20 minutes at 300° C. PMAS-1 swelled in m-cresol, and was insoluble in concentrated sulfuric acid, hot DMAC, sulfolane and dioxane. Its infrared spectrum was consistent with that expected for the compound. Its DTA in air and its TGA in air showed solvent retention and an inflection point in the 500° C. region.

Analysis: Calc'd. for $C_{250}H_{128}N_{18}O_{52}$: C, 71.22; H, 3.06; N, 5.98; O, 1974. Found: C, 71.22; H, 3.22; N, 6.17; O, - - -.

EXAMPLE 18

Preparation of Polyimide (PI-1). Reaction of BTCA and ODA (1:1).

In a m-cresol:benzene azeotropic apparatus equipped with a nitrogen inlet and outlet tube a solution of BTCA (12.899 g., 0.04 mole) in 50 ml. of dry DMAC was prepared at 40° C. To this solution, a solution of ODA (8.0096 g., 0.04 mole) in 50 ml. of DMAC was added during the course of 30 minutes, yielding an amber-colored viscous solution which was heated further at 40° C. for 30 minutes and at 85° C. for 1 hour. After cooling the solution to 50° C., acetic anhydride (12.25 g., 0.12 mole) was added slowly. A yellow precipitate, which formed as the acetic anhydride was added, redissolved with continued stirring. The clear viscous solution was heated at 85° C. for 1 hour, during which time a thick yellow precipitate formed. The reaction mixture was cooled and poured into 400 ml. of methanol and stirred. The yellow solid was collected by filtration washed with methanol and dried in a vacuum oven at 100° C. 19.5 g. (~100%); m.p.>400° C. The polymer was soluble in hot N-methyl-2-pyrrolidone and in hot m-cresol, but insoluble in DMAC. A sample block-dried at 150° C. was analyzed.

Its infrared spectrum showed a strong peak at $5.82\mu$ and a shoulder at $5.63\mu$ for the cyclic imide structure; and a broad band in the $3\mu$ region for carboxyl. A 4 g. sample of the polymer was reheated with 15 ml. of acetic anhydride at 140° C. for 6 hours, cooled and the yellow solid (3.96 g.) was collected by filtration, washed with methanol and dried in a vacuum oven at 140° C. Its infrared spectrum was identical with that of the untreated sample; a sample block-dried at 150° C. was analyzed.

Analysis: Calc'd. for $C_{29}H_{14}N_2O_6$: C, 71.61; H, 2.90; N, 5.76. Found: C, 70.50; H, 2.77; N, 5.88.

EXAMPLE 18a

In a m-cresol:benzene azeotropic apparatus was placed 4,4'-methylene dianiline (MDA) (1.98 g., 0.01 mole), pyromellitic anhydride (PMA) (2.18 g., 0.01 mole) 35 ml. of m-cresol and 10 ml. of benzene. The mixture was heated to 100°–105° C. and at the end of 30 minutes 0.18 g. of water was collected in the trap. Then the trap was removed and the benzene recovered by distillation leaving a clear solution of completely cycled polyimide.

EXAMPLE 18b

The composition of Example 18a consisting of the same amounts of MDA, PMA, benzene and m-cresol were placed in a distillation flask equipped with a condenser, receiver, etc. On heating to 100°–105° C. some water-benzene azeotrope distilled at 69.4° C. but the vapor temperature rose slowly and increased to that of benzene with none of the benzene being recycled to the reaction mixture. Within 20 minutes, all of the benzene had distilled from the reaction mixture, the pot temperature rose to 145°–150° C., and the contents of the flask gelled and precipitated from the m-cresol. Titration of a sample of the precipitated polymer with standardized base gave values which corresponded to 81% cyclization; in addition the polymer was crosslinked and insoluble in m-cresol, DMF and DMAC.

EXAMPLE 19

Preparation of Polyimide (PI-7). Reaction of BTCA and DAPB-3,3 (1:1) and Some Postreactions of PI-7.

In a m-cresol:benzene azeotropic apparatus was placed 1,3-di(3-aminophenoxy)benzene (1.4617 g., 0.005 mole), BTCA (1.611 g., 0.005 mole), 40 ml. of m-cresol and 10 ml. of benzene. An initial precipitate dissolved after 20 minutes at 60°–70° C., to give an orange solution. As soon as reflux began, water collected in the DEAN-Stark trap, and at the end of 4½ hours, 0.18 ml. of water was collected. The Dean-Stark trap was removed and a distillation head, with a collection apparatus substituted in its place; approximately 7.5 ml. of benzene was collected.

A 10 ml. portion of the polymer solution was added dropwise to 50 ml. of stirred methanol. The solid was collected by filtration and stirred for 15 minutes in fresh hot methanol; the methanol washing was repeated twice, the solid recovered and vacuum-dried at 70° C. for 24 hours, to give PI-7 (0.6144 g.). When PI-7 was heated on a Fisher-Johns melting point block, it softened in the region of 100° C., was quite soft at 187° C., was partially molten at 225° C. with applied pressure, was completely molten at 245° c., and did not harden when heated slowly up to 300° C.

PI-7 was insoluble in carbon tetrachloride, tetrachloroethylene, methyl ethyl ketone, ether, ethyl acetate, 2-propanol, absolute ethanol, and benzene; it swelled in hot chlorobenzene, hot toluene, vcold chloroform, and cold tetrahydrofuran, and was soluble in m-cresol, DMAC, sulfolane and dioxane (b.p. 100° C.).

A film (A) was cast from a 5.00 ml. portion of the polymer solution which contained 0.063 g./ml. of PI-7. The film was cured at 100° C. for 18 hours, then the temperature was raised to 200° C. over 6 hours, and maintained at 200° C. for 2½ days, followed by 300° C. for 24 hours to give film A, which was insoluble in hot m-cresol.

Another film (B) was prepared by the procedure given for film A by using 4.0 ml. (0.0005 mole of polymer) of the polymer solution to which was added a solution of oxydianiline (0.020 g., 0.0001 mole) in 1.0 ml. m-cresol. The film was insoluble in hot m-cresol.

The adhesion of films A and B to the glass casting plate was sufficiently high that the films could not be lifted after immersion in water, water-5% DMAC or dioxane for 7 days at temperatures of 80°–100° C. The films were released by soaking, at 70° C. for 48 hours, in DMAC, in which the 300° C. cured films were insoluble.

A solution sample of approximately 21 ml. of Polyimide PI-7 was heated at 115° C. for 18 hours, then at 200° C. for 24 hours. An observable increase in viscosity was noted. About 14 ml. of m-cresol was removed by distillation and the polymer precipitated in methanol and vacuum-dried at 50° C. for 20 hours, to yield 1.283 g. (97%) of PI-7, inherent viscosity in m-cresol (0.5%), 0.27 dl/g and in concentrated sulfuric acid (0.5%), 0.30 dl./g. PI-7a was soluble in the same solvents as PI7, namely, m-cresol, DMAC, sulfolane and dioxane. The thermal behavior of PI-7a, for example, such as softening, hardening, etc. was the same as PI-7. The TGA inflection point of PI-7a of approximately 525° C. in nitrogen and the 60% residue at 1000° C. was the same as PI-7. The TGA inflection point in air was the same as PI-7 at approximately 500° C., showing a zero char residue at 800° C. due to burning.

Analysis: Calc'd. for $C_{35}H_{18}N_2O_7$: C, 72.66; H, 3.14; N, 4.84; O, 19.36. Found: C, 72.44; H, 3.18; N, 4.87; O, - - -.

EXAMPLE 20

Polyimide (PI-8). Copolymer Reaction of BTCA with DAPB-3,3 and ODA (2:0.5:1.5).

This polymer was prepared from DAPB-3,3 (0.365 g., 0.00125 mole), ODA (0.705 g., 0.00375 mole), and BTCA (1.611 g., 0.005 mole) in which the mole ratio is 0.5:1.5:2.0, by the azeotropic technique, precipitated in methanol and vacuum-dried at 70° C. The polymer was soluble in m-cresol, DMAC and sulfolane but insoluble in dioxane. It softened and flowed with applied pressure in the range of 230°–280° C.; rehardened by 300° C.; ηinh (0.5% m-cresol) 0.525 dl./g. The thermal stabilities in nitrogen and in air of PI-8 dried at 70° C. and at 200° C. were substantially identical to PI-7 treated similarly.

Analysis: Calc'd for $C_{122}H_{70}N_8O_{25}$ :
C, 71.55; H, 3.45; N, 5.47; O, 19.53. Found: C, 70.70; H, 3.01; N, 5.46; O, - - - .

The example can be repeated using xylene and toluene as the azeotroping agent resulting in an azeotroping temperature about 10 to 15° C. higher than for benzene.

EXAMPLE 21

Preparation of (PI-15). Reaction of BTCA and SDA-3,3 (1:1.1) and Bodying in Air.

In a m-cresol:benzene azeotropic apparatus equipped with a mechanical stirrer, Dean-Stark trap and condenser was placed BTCA (17.6150 g., 0.050 mole) and SDA-3,3 (13.6670 g. 0.055 mole) with 75 ml. of m-cresol and 25 ml. of benzene. The mixture was stirred and heated to reflux. During 3 hours of reflux 1.75 ml. of water was collected. Then the Dean-Stark trap was removed and a distillation apparatus was substituted in its place and solvent was distilled off until m-cresol (b.p. 202° C.) began to distill over. The distillation apparatus was removed and a reflux condenser installed in its place, and reflux was maintained for 12½ hours. Then a small portion was removed and the polymer (PI-15A) was precipitated with methanol, which, after vacuum-drying at 70° C., had an $\eta_{inh}$ (as a 0.5% solution in m-cresol) of 0.409 dl./g.

After an additional 30 hours of reflux, a sample of the polymer was precipitated with methanol to give PI-15B as a light-yellow solid whose $\eta_{inh}$ as a 0.5% solution in m-cresol was 0.43 dl./g. After an additional 54.5 hours of reflux the bulk of the reaction solution was added to methanol and the resulting light-brown polymer (PI-15C) had an $\eta_{inh}$ as a 0.5% solution in m-cresol of 0.295 dl./g. which indicated that bodying of such polyimides is preferably performed in the absence of air and in an inert atmosphere such as $N_2$, He, CO, $CO_2$, argon, etc.

Upon pouring off the reaction solution a gelled film on the inside of the reaction flask was found. After grinding the gel in a mechanical blender with methanol and vacuum-drying, there are obtained 1.75 g. of a dark solid, PI-15d.

The weight of PI-15A was 0.80 g.; PI-15B, 4.37 g.; PI-15C, 21.35 g.; and PI-15D, 1.75 g. (5.8%): total yield, 28.27 g. (96%).

EXAMPLE 22

Preparation of Phenyl-Terminated Oligomeric Polyimide (BTOB-1). Reaction of BTCA, ODA and Aniline (2:1:2).

In a m-cresol:benzene azeotropic apparatus described previously, there was placed a solution of BTCA (3.222 g., 0.01 mole) in 25 ml. of m-cresol and 15 ml. of benzene. After warming to approximately 50° C., a solution of ODA (1.001 g., 0.005 mole) in 15 ml. of m-cresol was added, forming a copious yellow precipitate. After 10 minutes, a solution of freshly-distilled aniline (1.02 g., 0.011 mole) in 10 ml. of m-cresol was added. The reaction mixture was heated to reflux forming an orange solution. During 2 hours of reflux, 0.30 ml. of water was collected and a precipitate had formed. After cooling, the solvents were removed on a rotary flash evaporator and the residue dried in a vacuum oven at 100° C., to yield a yellow solid, 4.6390 g. (97%). Its infrared spectrum was consistent with the structure expected for the compound. On a Fisher-Johns melting point apparatus, it softened at 110° C., partially melted by 230° C., and rehardened at 235° C. It was soluble in hot m-cresol and insoluble in hot DMAC.

An intimate mixture of BTOB-1 and ODA in a molar ratio of 1:2 was placed on a Fisher-Johns apparatus previously heated to 250° C. The mixture melted, and as the color changed from yellow to reddish-orange, it hardened and did not remelt when heated to 300° C.

Analysis: Calc'd. for $C_{58}H_{30}N_4O_{11}$: C, 72.65; H, 3.15; N, 5.84; O, 18.36. Found: C, 73.00; H, 3.43; N, 4.66; O, - - -.

EXAMPLE 23

Preparation of Phenolic-Terminated Oligomeric Polyimide (BTAP-1). Reaction of BTCA, ODA and p-Aminophenol (2:1:2).

In the m-cresol:benzene azeotropic apparatus was placed a solution of BTCA (3.222 g., 0.01 mole) in 25 ml. of m-cresol and 15 ml. of benzene. After warming to 50° C., a solution of ODA (1.001 g., 0.005 mole) in 15 ml. of m-cresol was added, forming an immediate yellow precipitate. Further heating did not dissolve the precipitate, and, after 10 minutes, a slurry of freshly purified p-aminophenol (m.p. 190°–193° C.; g., 0.01 mole) in 10 ml. of m-cresol was added. At reflux, the solid dissolved forming an orange solution. During 2 hours of reflux, 0.20 ml. of water was collected and a precipitate formed. Then, the solvents were removed on a rotary flash evaporator and the residue was vacuum-dried at 170° C., yielding a yellow solid, 4.907 g. (99%). Its infrared spectrum was consistent with the structure expected for the compound. It softened slightly at 50° C., was almost completely melted at 265°–280° C.; and rehardened at 283° C. It was soluble in hot m-cresol, hot DMAC and hot sulfolane..

Analysis: Calc'd. for $C_{58}H_{30}N_4O_{13}$: C, 70..30; H, 3,05; N, 5.65; O, 20.99. Found: C, 70.04; H, 3.01; N, 5.73; O, - - -.

EXAMPLE 24

Preparation of Amine-Terminated Oligomeric Polyimide (BTAT-2). Reaction of BTCA and ODA (3:4).

In a m-cresol:benzene azeotropic apparatus was placed a solution of ODA (3.004 g., 0.016 mole) in 20 ml. of m-cresol and 10 ml. of benzene. After warming to 60° C., a solution of BTCA (3.867 g., 0.012 mole) in 30 ml. of m-cresol was added. A copious yellow precipitate formed immediately. The reaction mixture was heated to reflux and the solid material dissolved, forming an orange solution. During 2 hours of reflux 0.35 ml. of water was collected and a precipitate formed in the reaction flask. After cooling, the reaction mixture was concentrated to approximately one-third the original volume on a rotary flash evaporator. The mixture was then added to 150 ml. of methanol and allowed to stand for 10 hours. The solids were filtered off, digested twice in hot methanol, isolated and dried in a vacuum oven at 170° C., to yield a yellow solid, 6.311 g. (96%). It softened very slightly at 70° C., at 235° C. it rehardened and did not melt when heated up to 300° C. It was very slightly soluble in hot m-cresol, hot DMAC and hot sulfolane. Its infrared spectrum was consistent with that expected for the structure of the oligomer.

Analysis: Calc'd. for $C_{99}H_{54}N_8O_{19}$: C, 71.65; H, 3.28; N, 6.75; O, 18.32. Found: C, 71.21; H, 3.03; N, 6.63; O, - - -.

EXAMPLE 25

Preparation of Amine-Terminated Oligomeric Polyimide (BTAT-3). Reaction of BTCA and ODA (7:8).

In the m-cresol:benzene azeotropic apparatus was placed 4,4'-oxydianiline (ODA) (3.204 g., 0.016 mole) in 20 ml. of m-cresol and 10 ml. of benzene. After warming to 60° C., a solution of BTCA (4.512 g., 0.014 mole) in 30 ml. m-cresol was added. A copious yellow precipitate formed immediately. The reaction mixture was heated to reflux and the solid material dissolved, forming an orange solution. After 2 hours of reflux, 0.30 ml. of water had been collected and a precipitate had formed in the reaction flask. After cooling, the reaction mixture was concentrated on a rotary flash evaporator and then vacuum-dried at 170° C. to give 7.0960 g. (~100%) of a yellow solid which was slightly soluble in m-cresol, and insoluble in sulfolane and DMAC. On a Fisher-Johns melting point apparatus it softened slightly at about 210° C., partially melted by 235° C., and rehardened to a granular solid at 240° C.

Analysis: Calc'd. for $C_{215}H_{110}N_{16}O_{43}$: C, 72.18; H, 3.10; N, 5.48. Found: C, 70.26; H, 3.26; N, 6.11.

When the above procedure was repeated but the azeotropic agent was omitted, and the condensation performed by heating, benzene and some water distilled off, then benzene distilled off and when heating was continued the temperature in the flask rose and approached the b.p. of m-cresol. Before condensation and cyclization was complete, gellation occurred. The acid value of the isolated product indicated that about 20% of the carboxylic groups were not cyclized.

EXAMPLE 26

Preparation of Oligomeric Anhydride (BTOD-2). Reaction of BTCA and ODA (2:1).

In a 250-ml. three-neck, round-bottom flask equipped with a mechanical stirrer, dropping funnel, condenser, etc. a solution of BTCA (6.444 g., 0.02 mole) in 75 ml. of acetonitrile was prepared, at the reflux temperature (82° C.) of the acetonitrile. Then, a solution of ODA (2 g., 0.01 mole) in 50 ml. of warm (35° C.) acetonitrile was added slowly dropwise, forming a light-yellow precipitate. After the addition, the mixture was refluxed for ½ hour, and acetonitrile was removed in a rotary flash evaporator. The solid was dried in a vacuum oven at 80° C.; yield (A) 8.45 g. (100%) which was soluble in hot DMAC and N-methyl-2-pyrrolidone; but attempts to crystallize the product from these solvents were unsuccessful. The crude sample melts in a Fisher-Johns melting point apparatus in the range of 200°–210° C. Its infrared spectrum shows the peaks for anhydride groups at 5.38 and 5.6$\mu$, but also shows a broad band at 2.8 to 3.6$\mu$, which is attributable to carboxylic —OH, indicating the presence of some hemiamic acid structures and, thus, not complete cyclization.

In a 25-ml. round-bottom flask, equipped with a reflux condenser and drying tube, 1.4 g. of (A) was heated with 10 ml. of acetic anhydride at a reflux temperature of 140° C., to give a solution containing a small amount of a viscous, gummy product. Heating at reflux was continued for 2½ hours, and then allowed to cool. A bright-yellow precipitate was collected by filtration, washed with benzene and dried, to obtain fraction B (350 mg.), m.p. >300° C. The infrared spectrum of B showed that cyclization was now complete.

The filtrate, on evaporation to dryness, yielded (C) (1 g.), which softened at 90°–100° C. (Fisher-Johns Melting Point Apparatus); it melted to a clear liquid at 198°–205° C. in a melting point tube. Its infrared spectrum showed strong peaks for anhydride at 5.4 and 5.62$\mu$.

EXAMPLE 27

Preparation of Maleimide-Terminated Oligomeric Polyimide (BTMI-3). Reaction of BTCA, SDA-3,3 and Maleic Anhydride (8:9:2).

In the m-cresol:benzene azeotropic apparatus, there was placed SDA-3,3 (2.2320 g. (0.009 mole) in 15 ml. of m-cresol and 10 ml. of benzene. After warming to approximately 50° C., a solution of maleic anhydride (0.1961 g., 0.002 mole) in 15 ml. of m-cresol was added over about ½ hour. The resulting solution was heated at 100° C. for 1 hour, and then a solution of BTCA (2.5778 g., 0.008 mole) in 20 ml. of m-cresol was added. The solution was heated to reflux, and over 1½ hours 0.27 ml. of water was collected. After cooling the reaction mixture was concentrated on a rotary flash evaporator and the residue was vacuum-dried at 150° C. for 30 hours. The residue was then dissolved in 30 ml. of m-cresol at 70°–80° C. and acetic anhydride (0.4686 g., 0.00261 mole) and sodium acetate (0.0215 g., 0.000261 mole) were added. The solution was heated and stirred at 70 –80° C. for 4 hours. The oligomer was then precipitated with methanol and was washed three times with hot methanol to yield, after vacuum-drying at 110° C., 4.6 g. (94%) of a yellow solid whose infrared spectrum was consistent with the structure of the expected compound. BTMI-3 began to melt at 260° C. but did not completely melt by 300° C. It was soluble in hot m-cresol, swelled considerably in hot DMAC and hot sulfolane.

The TGA in air of BTMI-3 showed a weight loss of approximately 7% below 300° C., due to retained m-cresol. A small sample was dried at 300° C. for 1 hour to give BTMI-3-H300, whose TGA in air shows a break at 400° C. and an inflection point in excess of 500° C.

Analysis: Calc'd. for $C_{252}H_{124}N_{18}O_{62}S_9$: C, 64.61; H, 2.67; N, 5.38; O, 21.18; S, 6.16. Found: C, 64.34; H, 2.95; N, 5.43; O, - - - ; S, - - - .

EXAMPLE 28 a. Preparation of Maleimide-Terminated Oligomeric Polyimide (BTMI-4). Reaction of BTCA, SDA-4,4 and Maleic Anhydride (8:9:2).

In the m-cresol:benzene azeotropic apparatus there was place SDA-4,4 (2.2320 g., 0.009 mole) in 15 ml. of m-cresol and 10 ml. of benzene. After warming to approximately 50° C., a solution of maleic anhydride (0.1961 g., 0.002 mole) in 15 ml. of m-cresol was added over about ½ hour. The resulting solution was heated at 100° C. for 1 hour, and then a solution of BTCA (2.5778 g., 0.008 mole) in 20 ml. of m-cresol was added. The solution was heated to reflux and over 1½ hours 0.27 ml. of water was collected. After cooling, the reaction mixture was concentrated on a rotary flash evaporator and the residue was vacuum-dried at 150° C. for 30 hours. The residue was then dissolved in 30 ml. of m-cresol at 70°–80° C. and acetic anhydride (0.4685 g., 0.00261 mole) and sodium acetate (0.0215 g., 0.000261 mole) were added. The solution was heated and stirred at 70°–80° C. for 4 hours. The oligomer was then precipitated with methanol and was washed 3 times with hot methanol to yield, after vacuum-drying at 110° C., 4.3 g. (88%) of a yellow solid whose infrared spectrum was consistent with that expected for the compound, and very similar to that of BTMI-3. BTMI-4 began to melt at 255° C. but did not completely melt by 300° C. It was soluble in hot m-cresol, DMAC and sulfolane.

The TGA in air of BTMI-4 showed a loss of approximately 7% below 300° C., due to retained solvent. A small sample was dried at 300° C. for 1 hour to give BTMI-4-H300 whose TGA in air is identical with that of BTMI-3-H300 and showed an inflection point in excess of 500° C.

Analysis: Calc'd. for $C_{252}H_{124}N_{18}O_{62}S_9$: C, 64.61; H, 2.67; N, 5.38; O, 21.18; S, 6.16. Found: C, 64.35; H, 2.81; N, 5.53; O, - - - ; S, - - - .

b. Preparation of Maleamic Acid-Terminated Oligomeric Polyimide (BTMA-1). Reaction of BTCA, ODA and Maleic Anhydride (1:2:2).

In the m-cresol:benzene azeotropic apparatus was placed oxydianiline (ODA) (4.004 g., 0.02 mole) in 15 ml. of m-cresol and 10 ml. of benzene. After warming to 40° C., a solution of maleic anhydride (1.961 g., 0.02 mole) in 15 ml. of m-cresol was added to give a red solution, which was heated at 90°–100° C. for 1 hour. A yellow precipitate soon formed which did not redissolve. Then BTCA (3.222 g., 0.01 mole) in 35 ml. of m-cresol was added. The temperature was maintained at 90°–100° C. for 1 hour. Solution did not occur. Then the temperature was raised to approximately 110° C. (reflux) and maintained for 1½ hours. No water was collected in the Dean-Stark trap. Then the reaction mixture was cooled, the solvent removed on a rotary flash evaporator and the residue was vacuum-dried at 150° C. for 24 hours to yield the hemiamic acid, 8.7088 g. (95%). The product was partialy soluble in hot m-cresol and was insoluble in DMAC, sulfolane and acetic anhydride.

Analysis: Calc'd. for (hemiamic acid) $C_{49}H_{30}N_4O_{13}$: C, 66.66; H, 3.43; N, 6.30; O, 23.56. Found: C, 66.60; H, 3.55; N, 6.46; O, - - - .

EXAMPLE 29

Preparation of Phenol-Terminated Oligomeric Polyimide (BTAP-3). Reaction of BTCA, DAPB-3,3 and p-Aminophenol (9:8:2).

In the m-cresol:benzene azeotropic apparatus there was allowed to react BTCA (4.3501 g., 0.0135 mole), DAPB-3,3 (3.5080 g., 0.012 mole) and p-aminophenol (0.3274 g., 0.003 mole). There was obtained 7.5784 g. (98.5%) of a light-yellow solid (BTAP-3) after vacuum-drying at 70° C. On a Fisher-Johns melting point apparatus BTAP-3 melted from 205° C., to 220° C., thickened above 235° C. but did not reharden during 15 minutes at 300° C. BTAP-3 was soluble in m-cresol, DMAC, sulfolane and dioxane, swelled in hot chloroform, hot methylene chloride and hot tetrahydrofuran. It formed a separate oily phase in hot epichlorohydrin. The TGA in air data are given in Table I.

Analysis: Calc'd. for $C_{309}H_{160}N_{18}O_{63}$: C, 72.31; H, 3.14; N, 4.91; O, 19.64. Found: C, 72.00; H, 3.29; N, 4.95; O, - - - .

EXAMPLE 30

Preparation of Phenol-Terminated Oligomeric Polyimide (BTAP-5R). Reaction of BTCA, DAPB-3,3 and p-Aminophenol (5:4:2).

According to the m-cresol:benzene technique there was allowed to react BTCA (3.2223 g., 0.01 mole), DAPB-3,3 (2.3386 g., 0.008 mole) and p-aminophenol (0.4365 g., 0.004 mole). There was obtained 5.2805 g. (93.8%) of a fine yellow powder (BTAP-5R) which was soluble in m-cresol, DMAC, sulfolane and dioxane. On a Fisher-Johns melting point apparatus BTAP-5R melted at 180°–215° C. and did not reharden on being heated at 300° C. for 40 minutes. The lowest temperature at which a sample would melt completely when dropped onto the preheated stage was 205° C. The TGA in air data are given in Table I.

Analysis: Calc'd. for $C_{169}H_{88}N_{10}O_{35}$: (BTAP-5R) C, 72.01; H, 3.15; N, 4.97; O, 19.87. Found: C, 71.93; H, 3.22; N, 4.93; O, - - - .

Example 31

Preparation of Phenol-Terminated Oligomeric Polyimide (BTAP-6). Reaction of BTCA, DAPB-3,3 and p-Aminophenol (5:4:2) with Inverse Order of Addition of the Amine.

According to a modification of the m-cresol: benzene azeotropic technique there was allowed to react BTCA (3.2223 g., 0.01 mole) and DAPB-3,3 (2.3386 g., 0.008 mole) for 5 hours. Then p-aminophenol (0.4365 g., 0.004 mole) was added and the reaction continued for an additional 5 hours. The reaction solution was slightly hazy. After the usual isolation procedure there was obtained BTAP-6 as a light yellow solid, 5.4177 g. (96%). On a Fisher-Johns melting point apparatus BTAP-6 melted over the range 192°–205° C. and did not reharden when heated at 300° C. for 30 minutes. The lowest temperature at which a sample would melt when dropped onto the preheated stage was 205° C.

BTAP-6 was soluble in m-cresol, DMAC, DMF, sulfolane and dioxane. However, when a small sample was added to preheated dioxane or preheated DMAC, most of the sample formed a gelled mass which did not dissolve on further heating. The infrared spectrum of BTAP-6 was identical to the infrared spectrum of BTAP-5R. The DTA in nitrogen of BTAP-6 displayed a broad endotherm centered at 175° C., followed by a mild exotherm and then another endotherm at 270° C. The DTA in nitrogen of BTAP-5R showed similar peaks. The TGA data in air are given in Table I.

EXAMPLE 32

Preparation of Amine-Terminated Oligomeric Polyimide (BTAT-4). Reaction of BTCA and SDA-3,3 (4:5).

In a m-cresol:benzene azeotropic apparatus was placed BTCA (11.2781 g., 0.035 mole), SDA-3,3 (10.8760 g., 0.0438 mole), 80 ml. of m-cresol and 10 ml. of benzene. The mixture was refluxed for 3½ hours during which time 1.3 ml. of water was collected. Then, the benzene was distilled off and the solution was precipitated in methanol. The precipitated oligomer was digested three times in hot methanol and then vacuum dried at 70° C. for 24 hours to give BTAT-4, 19.7498 g. (95%) as a light-yellow solid which was soluble in m-cresol, DMAC and sulfolane. It swelled in hot dioxane. On a Fisher-Johns apparatus, it softened slightly above 180° C., melted at 245°–280° C. and rehardened after 5 minutes at 300° C. The lowest temperature at which a sample would melt completely dropped onto the preheated block was 270° C. The TGA in air data are given in Table I.

A sample was vacuum-dried at 200° C. and submitted for analysis.

Analysis: Calc'd. for $C_{128}H_{68}N_{10}O_{30}S_5$: C, 64.42; H, 2.87; N, 5.87; O, 20.12; S, 6.72. Found: C, 63.71; H, 2.91; N, 5.75; O, - - - ; S, - - - .

EXAMPLE 33

Preparation of Amine-Terminated Oligomeric Polyimide (BTAT-5). Reaction of BTCA and SDA-3,3 (8:9).

According to the procedure used in Example 32, there was allowed to react BTCA (11.2781 g., 0.035 mole) and SDA-3,3 (9.7834 g., 0.0394 mole) in 80 ml. of m-cresol and 10 ml. of benzene. There was obtained the oligomer, BTAT-5, as a light-yellow solid, 18.3 g. (92.5%) which was soluble in m-cresol, DMAC and sulfolane. It swelled in hot dioxane. On a Fisher-Johns apparatus it began to melt at 225° C. but was not completely melted by 300° C., at which temperature it hardened in 3 minutes. The lowest temperature at which a sample would melt completely when dropped onto the preheated block was 280° C. The TGA in air data are given in Table I.

The analysis was performed on a small sample vacuum-dried at 200° C.

Analysis: Calc'd. for $C_{244}H_{124}N_{18}O_{58}S_9$: C, 64.77; H, 2.76; N, 5.57; O, 20.51; S, 6.38. Found: C, 63.54; H, 2.81; N, 5.45; O, - - - ; S, - - - .

EXAMPLE 34

Preparation of Amine-Terminated Oligomeric Polyimide (BTAT-6). Reaction of BTCA and DAPB-3,3 (4:5).

According to the procedure for example 32, BTCA (3.2223 g., 0.01 mole) and DAPB-3,3 (3.7529 g., 0.0125 mole) were allowed to react. There was obtained BTAT-6, 6.1215 g. (94%) as a yellow powder. On a Fisher-Johns melting point apparatus BTAT-6 melted from 180°–200° C. and rehardened after 30 minutes at 300° C. The lowest temperature at which a sample completely melted when dropped onto a preheated block was 190° C. BTAT-6 was soluble in m-cresol, DMAC, sulfolane and dioxane. The TGA in air data are given in Table I.

A sample was vacuum-dried at 200° C. for analysis.

Analysis: Calc'd. for $C_{158}H_{88}N_{10}O_{30}$: C, 72.81; H, 3.40; N, 5.37; O, 18.42. Found: C, 72.72; H, 3.35; N, 4.77; O, - - - .

EXAMPLE 35

Preparation of Amine-Terminated Oligomeric Polyimide (BTAT-7). Reaction of BTCA and DAPB-3,3 (8:9).

According to the procedure for Example 32, BTCA (3.2223 g., 0.01 mole) and DAPB-3,3 (3.2887 g., 0.01125 mole) were allowed to react. There was obtained BTAT-7 as a yellow powder, 5.8708 g. (95.4%). On a Fisher-Johns apparatus BTAT-7 began to melt from 190° C. but did not completely melt by 300° C., when it hardened in 30 minutes. The lowest temperature at which a sample melted when dropped onto a preheated block was 220° C. BTAT-6 was soluble in m-cresol, DMAC, sulfolane and dioxane. The TGA in air data are given in Table I.

A small sample was vacuum-dried at 200° C. for analysis.

Analysis: Calc'd. for $C_{298}H_{160}N_{18}O_{58}$: C, 72.74; H, 3.28; N, 5.12; O, 18.86. Found: C, 72.45; H, 3.31; N, 5.04; O, - - - .

EXAMPLE 36

Preparation of Anhydride-Terminated Oligomeric Polyimide (BTOD-3). Reaction of BTCA and SDA-3,3 (5:4).

According to the procedure used for Example 32, there was allowed to react BTCA (12.0827 g., 0.0375 mole) and SDA-3,3 (7.4493 g., 0.03 mole) in 80 ml. of m-cresol and 10 ml. of benzene. There was obtained the oligomer BTOD-3, as a light-yellow solid, 16.9 g. (92%) which was soluble in m-cresol, DMAC, DMF and sulfolane. It softened at 240° C., melted from 245°–265° C., with the evolution of small amounts of gas, and did not harden during 30 minutes at 300° C. The lowest temperature at which a sample melted completely when dropped onto a preheated block was 255° C.

A small sample was vacuum-dried at 200° C. and submitted for analysis.

Analysis: Calc'd. for $C_{133}H_{62}N_7O_{35}S_4$: C, 65.30; H, 2.56; N, 4.01; O, 22.89; S, 4.24. Found: C, 63.90; H, 2.74; N, 4.70; O, - - - ; S, - - - .

EXAMPLE 37

Preparation of Anhydride-Terminated Oligomeric Polyimide (BTOD-4). Reaction of BTCA and SDA-3,3 (9:8).

According to the procedure used for Example 32, there was allowed to react BTCA (14.5003 g., 0.045 mole) and SDA-3,3 (9.9324 g., 0.04 mole) in 90 ml. of m-cresol and 20 ml. of benzene. There was obtained the oligomer, BTOD-4, as a light-yellow solid, 21.4 g. (95%) which was soluble in m-cresol, DMAC, DMF and sulfolane. It began to melt at 265° C. with the evolution of small amounts of gas, but was not melted completely by 300° C. and did not harden during 15 minutes at 300° C. The lowest temperature at which a sample melted completely when dropped onto a preheated block was 270° C. The TGA in air data are given in Table I.

A small sample vacuum-dried at 200° C. was submitted for analysis.

Analysis: Calc'd. for $C_{249}H_{118}N_{15}O_{63}S_8$: C, 65.24; H, 2.60; N, 4.58; O, 21.99; S, 5.60. Found: C, 63.99; H, 2.73; N, 4.95; O, - - - ; S - - - .

EXAMPLE 38

Preparation of Anhydride-Terminated Oligomeric Polyimide (BTOD-5). Reaction of BTCA and DAPB-3,3 (5:4).

According to the procedure used for Example 32, there was allowed to react BTCA (4.0279 g., 0.0125 mole) and DAPB-3,3 (2.9223 g., 0.01 mole) in 40 ml. of m-cresol and 10 ml. of benzene. There was obtained the oligomer BTOD-5 (5.7678 g., 80%) as a light-yellow powder which was soluble in m-cresol, DMAC, sulfolane and dioxane. On a Fisher-Johns melting point apparatus BTOD-5 melted over the range of 190°–205° C. with gas evolution and did not harden during 10 minutes at 300° C. The lowest temperature at which a sample melted completely when dropped onto a preheated block was 200° C. The TGA in air data are given in Table I.

Analysis: Calc'd. for $C_{157}H_{78}N_8O_{35}$:
C, 71.52; H, 2.98; N, 4.25; O, 21.24. Found: C, 71.41; H, 3.21; N, 4.46; O, - - - .

EXAMPLE 39

Preparation of Anhydride-Terminated Oligomeric Polyimide (BTOD-6). Reaction of BTCA and DAPB-3,3 (9:8).

According to the procedure used for Example 32, there was allowed to react BTCA (3.6251 g., 0.01125 mole) and DAPB-3,3 (2.9223 g. 0.01 mole) in 40 ml. of m-cresol and 10 ml. of benzene. There was obtained BTOD-6 (5.6071 g., 90%) as a light-yellow powder which was soluble in m-cresol, DMAC, sulfolane and dioxane. On a Fisher-Johns melting point apparatus BTOD-6 melted from 185°–215° C. with some evolution of gas and did not harden during 10 minutes at 300° C. The lowest temperature at which a sample would completely melt when dropped onto a preheated block was 210° C. The TGA in air data are given in Table I.

Analysis: Calc'd. for $C_{297}H_{150}N_{16}O_{63}$: C, 72.03; H, 3.09; N, 4.53; O, 20.35. Found: C, 71.09; H, 3.22; N, 4.60; O, - - - .

The TGA's of each oligomer of Examples were performed in air at a heating rate of 10° C./minute. The data are summarized in Table 4.

TABLE I.

| | TGA IN AIR DATA FOR OLIGOMERIC POLYIMIDES | | | | | | |
|---|---|---|---|---|---|---|---|
| Oligomer | TGA: Percent Residue at | | | | | | |
| (Ex. No.) | 200° C. | 300° C. | 400° C. | 500° C. | 600° C. | 700° C. | 800° C. |
| BTAP-3 (29) | 100 | 100 | 100 | 99 | 88 | 51 | 0 |
| BTAP-5R (30) | 100 | 100 | 99 | 97 | 82 | 0 | 0 |
| BTAP-6 (31) | 100 | 100 | 99 | 96 | 80 | 0 | 0 |
| BTAT-4 (32) | 100 | 100 | 99 | 98 | 84 | 25 | 0 |
| BTAT-5 (33) | 100 | 100 | 99 | 98 | 87 | 0 | 0 |
| BTAT-6 (34) | 100 | 100 | 100 | 99 | 80 | 20 | 0 |
| BTAT-7 (35) | 100 | 100 | 100 | 99 | 77 | 0 | 0 |
| BTOD-3 (36) | 98 | 97 | 96 | 93 | 74 | 0 | 0 |
| BTOD-4 (37) | 100 | 98 | 98 | 96 | 75 | 0 | 0 |
| BTOD-5 (38) | 98 | 97 | 96 | 95 | 83 | 0 | 0 |
| BTOD-6 (39) | 98 | 98 | 97 | 96 | 81 | 0 | 0 |

EXAMPLE 40

Preparation of Polyimide (PI-20). Reaction of BTCA and DAPB-3,3 (1:1) under Nitrogen.

In a m-cresol:benzene azeotropic apparatus equipped with provision for nitrogen inlet and outlet, there was placed BTCA (3.222 g., 0.01 mole) with 25 ml. of m-cresol and 10 ml. of benzene. The mixture was warmed until solution occurred; then a solution of DAPB-3,3 (2.923 g., 0.01 mole) in 15 ml. of m-cresol was added. The solution was refluxed for 4 hours under nitrogen and 0.4 ml. of water was collected. Then the benzene was distilled off and the temperature was raised to the reflux temperature of m-cresol. The reaction mixture was refluxed under nitrogen for 24 hours and then a small sample was removed and the polymer was precipitated with methanol to give PI-20A, whose $\eta$inh, after vacuum-drying at 70° C., was 0.41 dl./g. as a 0.5% solution in m-cresol. The infrared spectrum of PI-20A was consistent with the structure expected for a completely cyclized polyimide.

Further bodying of PI-20 by refluxing in a m-cresol under nitrogen was continued to a total of 68 hours, after which a small sample was removed and the polymer precipitated with methanol to yield PI-20B, whose $\eta$inh (0.5% m-cresol) was 0.742 dl./g. After refluxing to a total of 86 hours, a trace amount of gelled material was found in the flask and reflux was discontinued. The polymer was precipitated with methanol to give PI-20C, whose $\eta$inh (0.5% m-cresol) was 0.825 dl./g. PI-20C was soluble in m-cresol, DMAC, sulfolane and dioxane. Its TGA in air showed a minor break at 475° C. and inflection point at about 575° C.

Analysis: Calc'd. for ($C_{35}H_{18}N_2O_7$) : (PI-20A) C, 72.66; H, 3.14; N, 4.84; O, 19.36. Found: C, 72.18; H, 3.35; N, 4.90; O, - - - .

The elemental analysis of the polymer is in excellent agreement with the values calculated for a substantially or completely cyclized polyimide of high molecular weight.

What is claimed is:

1. A process for the preparation of a substantially cyclized polyimide of the formula:

(A) 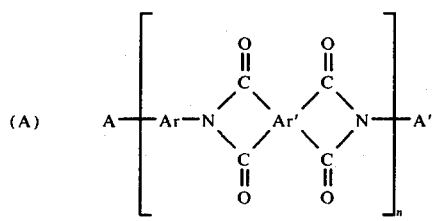

wherein
Ar is a divalent aromatic oganic radical,
Ar' is a tetravalent aromatic organic radical, the four carbonyl groups being attached directly to separate carbon atoms and each pair of carbonyl groups being attached to adjacent carbon atoms in the Ar' radical,
A is $NH_2-$,

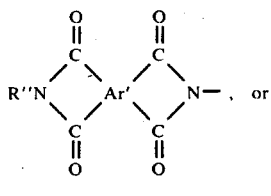, or

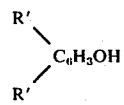

where R" is defined hereinafter, A' is $-R''$, $-ArNH_2$,

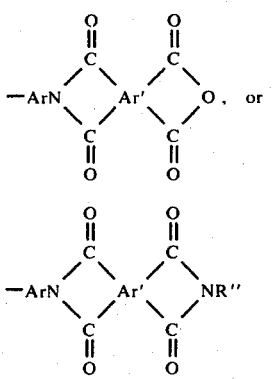

where R" is defined hereinafter, and
n is 0 or a positive integer of at least one, soluble in a phenol which comprises:
1. reacting a reaction mixture of at least one tetracarboxylic acid dianhydride of the formula:

(B) 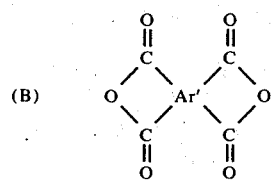

wherein
Ar' is as defined above, and at least one aromatic diamine of the formula:

$$H_2N-Ar-NH_2 \quad (C)$$

wherein Ar is as defined above, at a molar ratio of dianhydride to diamine in the range of m to m + 1:m to m + 1 where m is a positive integer of at least one and as high as n in formula (A), with the proviso that when the ratio of dianhydride to diamine is m + 1:m, the reaction mixture contains 0 or 2 moles of a monoamine of the formula R"$NH_2$ wherein R" is a hydrocarbon radical of 1 to 12 carbon atoms which is saturated, has olefinic unsaturation or acetylenic unsaturation, and —CN, —CHO or —CH=NR" substituted derivatives thereof,

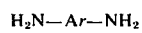

where each R' is hydrogen or $-CH_3$ in the presence of at least one organic azeotroping agent which:
 a. gives a water azeotrope having a boiling point less than 95° C at atmospheric pressure,
 b. is non-reactive with the dianhydride and the diamine, and
 c. separates from water as a distinct phase, said reaction conducted at a temperature less than 140° C and below the boiling point of said phenol and higher than the boiling point of said azeotroping agent with the vapor phase temperature being between that of the water azeotrope and no higher than 95° C
2. removing water of reaction and the azeotroping agent from the reaction mixture as a water azeotrope and
3. returning quantities of azeotroping agent to the reaction mixture to maintain the temperature and reaction mixture volume substantially constant.

2. The process of claim 1 wherein the phenol is m-cresol or a mixture of m-cresol and its isomers.

3. The process of claim 1 wherein the organic azeotroping agent is a cyclic hydrocarbon having 6 to 8 carbon atoms.

4. The process of claim 3 wherein the cyclic hydrocarbon is an aromatic hydrocarbon.

5. The process of claim 4 wherein the aromatic hydrocarbon is benzene or toluene.

6. The process of claim 1 wherein Ar' is a tetravalent radical containing at least one ring of six carbon atoms, said ring characterized by benzenoid unsaturation.

7. The process of claim 6 wherein Ar is a divalent benzenoid radical selected from the group consisting of

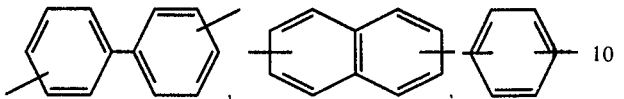

and multiples thereof connected to each other by $R^{IV}$ wherein $R^{IV}$ is selected from the group consisting of —CH=CH—, an alkylene chain of 1–3 carbon atoms,

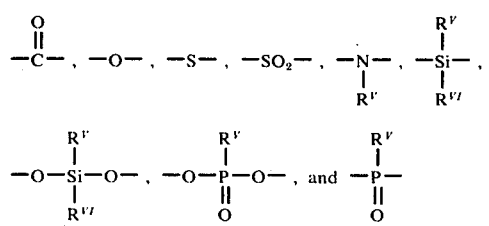

wherein $R^V$ and $R^{VI}$ are selected from the group consisting of alkyl of 1 to 6 carbon atoms a aryl of 6 carbon atoms 8. The process of claim 7 wherein the phenol is m-cresol or a mixture of m-cresol and its isomers and the organic azeotroping agent is a cyclic hydrocarbon of 6 to 8 carbon atoms.

9. The process of claim 8 wherein the cyclic hydrocarbon is an aromatic hydrocarbon.

10. The process of claim 7 wherein n is at least 4, A is

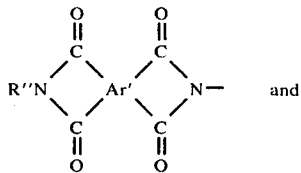 and

A' is —R'' or

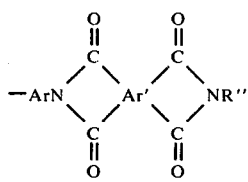

11. The process of claim 10 wherein R'' is allyl, styryl, propargyl, —C₆H₄CN or —C₆H₄CH₂CN, —C₆H₄C ≡ CH, —C₆H₄OH,.

12. The process of claim 11 wherein the phenol is m-cresol or a mixture of m-cresol and its isomers and the organic azeotroping agent is a cyclic hydrocarbon of 6 to 8 carbon atoms.

13. The process of claim 1 wherein (1) the tetracarboxylic acid dianhydride is selected from the group consisting of 3,3',4,4'-benzophenonetetracarboxylic acid dianhydride, pyromellitic anhydride and 1,4,5,8-naphthalenetetracarboxylic acid dianhydride, (2) the aromatic diamine is selected from the group consisting of m-phenylenediamine, p-phenylenediamine, 4,4'-oxydianiline, 3,3'-sulfonyldianiline, 4,4'-diaminobenzophenone, 4,4'-methylenedianiline and 4,4'-diaminostilbene, (3) R''NH₂ is selected from the group consisting of styryl amine, amino phenyl acetylene, p-aminophenol, allyl amine, propargyl amine, aminobenzonitrile and aminobenzyl cyanide, (4) the phenol is m-cresol or mixtures of m-cresol and its isomers and (5) the organic azeotroping agent is a cyclic hydrocarbon of 6 to 8 carbon atoms.

14. The process of claim 13 wherein the cyclic hydrocarbon is an aromatic hydrocarbon.

15. The process of claim 14 wherein n is at least 4 and the aromatic hydrocarbon is benzene.

16. The process of claim 13 wherein the cyclic hydrocarbon is subsequently removed.

17. The process of claim 1 wherein the azeotroping agent is subsequently removed.

18. An end-capped polyimide having the structural formula:

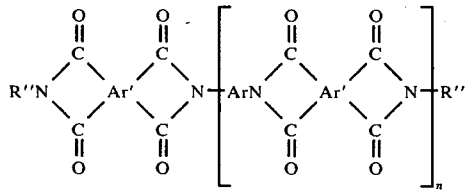

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical,
R'' is allyl, styryl,

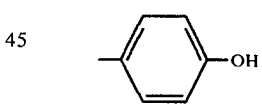

—C₆H₄CN or —C₆H₄CH₂CN, and
n is a positive integer of at least 4.

19. The polyimide of claim 18 wherein Ar' is a tetravalent radical containing at least one ring of six carbon atoms, said ring characterized by benzenoid unsaturation.

20. The polyimide of claim 19 wherein Ar is a divalent benzenoid radical selected from the group consisting of

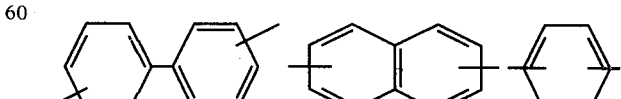

and multiples thereof connected to each other by $R^{IV}$ wherein $R^{IV}$ is selected from the group consisting of —CH=CH—, an alkylene chain of 1–3 carbon atoms,

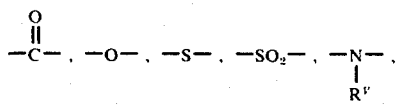

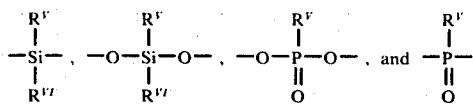

wherein $R^V$ and $R^{VI}$ are selected from the group consisting of alkyl of 1 to 6 carbon atoms or aryl of 6 carbon atoms.

21. A substantially cyclized polyimide soluble in phenols having the formula:

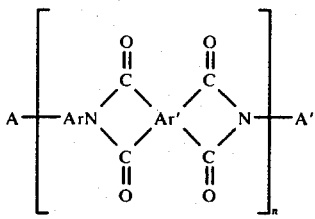

wherein

Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical,

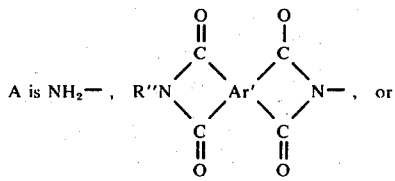

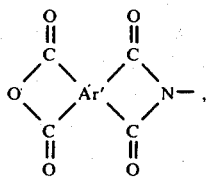

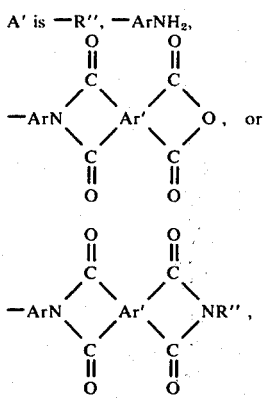

$R''$ is a hydrocarbon radical of 1 to 12 carbon atoms which is saturated, has olefinic unsaturation and —OH, —CN, —CHO or —CH=NR'' substituted derivatives thereof, and $n$ has a numerical value of 4 to 100.

22. The polyiminde of claim 21 in which the phenol is selected from the class of phenol, cresols and xylenols and mixtures thereof.

* * * * *